US012628195B2

(12) United States Patent
Hirata et al.

(10) Patent No.: US 12,628,195 B2
(45) Date of Patent: May 12, 2026

(54) WIRELESS COMMUNICATION APPARATUS AND METHOD

(71) Applicant: Sony Group Corporation, Tokyo (JP)

(72) Inventors: Ryuichi Hirata, Tokyo (JP); Yusuke Tanaka, Tokyo (JP); Hiromasa Uchiyama, Tokyo (JP); Shigeru Sugaya, Tokyo (JP); Kosuke Aio, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 422 days.

(21) Appl. No.: 18/042,782

(22) PCT Filed: Sep. 17, 2021

(86) PCT No.: PCT/JP2021/034239
§ 371 (c)(1),
(2) Date: Feb. 24, 2023

(87) PCT Pub. No.: WO2022/070976
PCT Pub. Date: Apr. 7, 2022

(65) Prior Publication Data
US 2023/0362975 A1 Nov. 9, 2023

(30) Foreign Application Priority Data
Oct. 2, 2020 (JP) ................................ 2020-167502

(51) Int. Cl.
*H04W 72/566* (2023.01)
*H04W 72/04* (2023.01)

(52) U.S. Cl.
CPC ......... *H04W 72/566* (2023.01); *H04W 72/04* (2013.01)

(58) Field of Classification Search
CPC ... H04W 72/566; H04W 72/04; H04W 76/15; H04W 84/12; H04W 4/06; H04B 7/0697;
(Continued)

(56) References Cited

U.S. PATENT DOCUMENTS 10,771,960 B2 * 9/2020 Frenne ................... H04W 24/08
2006/0092871 A1 * 5/2006 Nishibayashi .......... H04L 1/188
370/477
(Continued)

FOREIGN PATENT DOCUMENTS

CN 110572244 A 12/2019
JP 2003208700 A * 7/2003
JP 2006-352711 A 12/2006

OTHER PUBLICATIONS

International Search Report and Written Opinion mailed on Dec. 7, 2021, received for PCT Application PCT/JP2021/034239, filed on Sep. 17, 2021, 10 pages including English Translation.
(Continued)

*Primary Examiner* — Mohamed A Kamara
(74) *Attorney, Agent, or Firm* — XSENSUS LLP

(57) ABSTRACT

A wireless communication apparatus: performs communication using a first link; performs communication using a second link; and performs allocation control of allocating transmission data to first data and second data, transmission control of controlling transmission of the first data using the first link and transmission of the second data using the second link, and reception control of controlling reception using the first link of a first response including reception success/failure information indicating a success/failure of reception with respect to the first data and at least a part of the second data and reception using the second link of a second response including the reception success/failure information indicating a success/failure of reception with (Continued)

respect to the second data and at least a part of the first data. The present technique can be applied to wireless communication systems.

13 Claims, 10 Drawing Sheets

(58) Field of Classification Search
CPC ... H04L 1/1854; H04L 1/1893; H04L 1/1896; H04L 1/1614; H04L 1/1621
See application file for complete search history.

(56) References Cited

U.S. PATENT DOCUMENTS

| | | | |
|---|---|---|---|
| 2019/0045537 A1 | 2/2019 | Seok | |
| 2019/0150214 A1 | 5/2019 | Zhou et al. | |
| 2021/0409156 A1 | 12/2021 | Xu et al. | |
| 2022/0022127 A1* | 1/2022 | Chu | H04W 48/16 |
| 2023/0011167 A1* | 1/2023 | Chitrakar | H04W 74/0816 |
| 2023/0034209 A1* | 2/2023 | Lu | H04L 1/0015 |

OTHER PUBLICATIONS

Patil et al., "MLO: Acknowledgement Procedure", IEEE 802.11-20/0024r3, Available Online At: https://mentor.ieee.org/802.11/dcn/20/11-20-0024-03-00be-mlo-acknowledgement-procedure.pptx, Jan. 6, 2020, pp. 1-16.
Edward Au, "Compendium of straw polls and potential changes to the Specification Framework Document", IEEE P802.11 Wireless LANs, 20/0566r70, Available Online at: https://mentor.ieee.org/802.11/dcn/20/11-20-0566-70-00be-compendium-of-straw-polls-and-potential-changes-to-the-specification-framework-document.docx, Sep. 29, 2020, pp. 1-184.
Chu et al., "A-MPDU and BA", IEEE 802.11-19/1856r3, Available Online At: https: //mentor.ieee.org/802.I I/dcn/19/11-19-1856-03-00be-a-mpdu-and-ba.pptx, Nov. 6, 2019, pp. 1-14.

* cited by examiner

Fig. 8

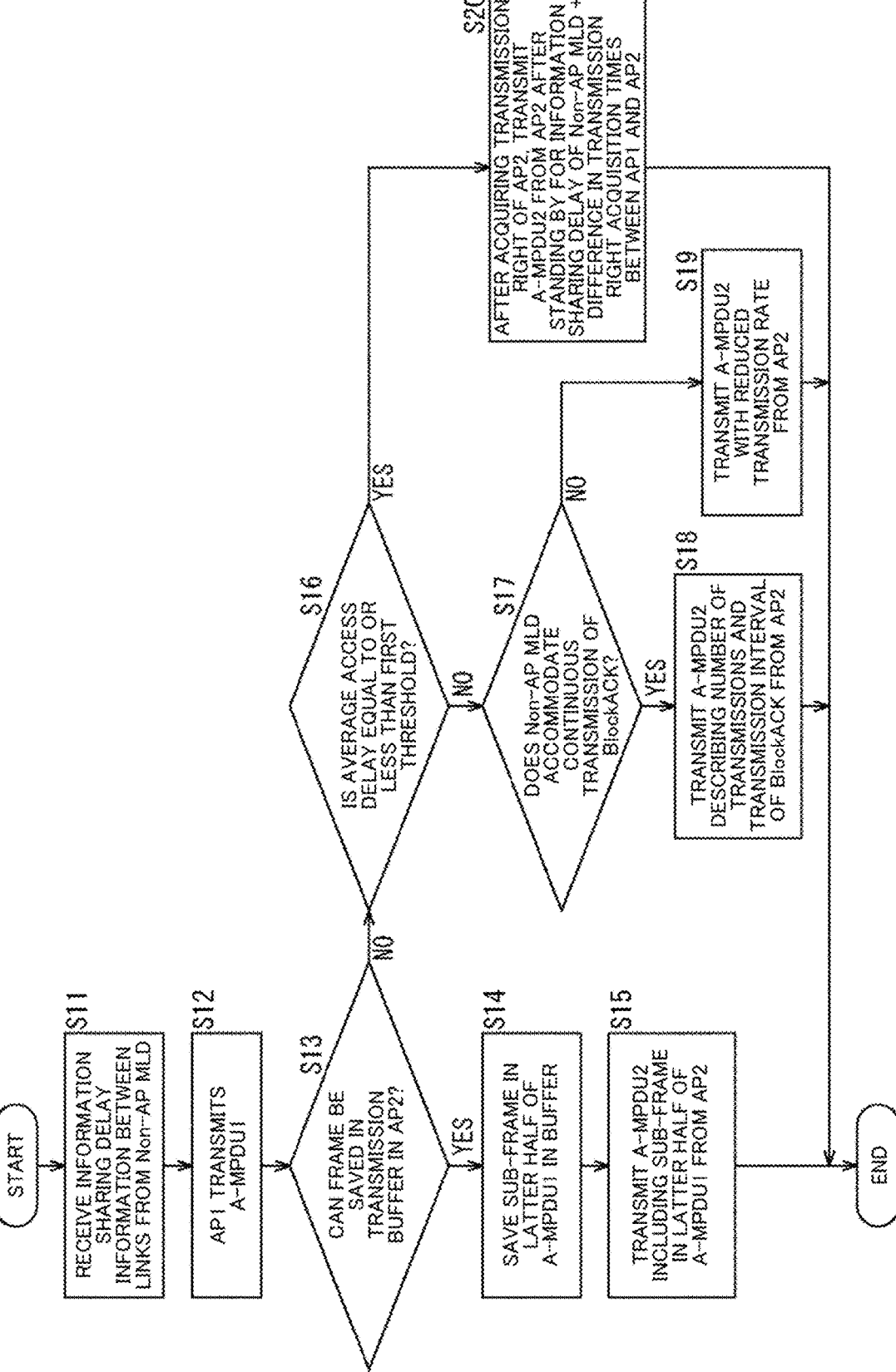

START

S11
RECEIVE INFORMATION SHARING DELAY INFORMATION BETWEEN LINKS FROM Non-AP MLD

S12
AP1 TRANSMITS A-MPDU1

S13
CAN FRAME BE SAVED IN TRANSMISSION BUFFER IN AP2?

YES →

S14
SAVE SUB-FRAME IN LATTER HALF OF A-MPDU1 IN BUFFER

S15
TRANSMIT A-MPDU2 INCLUDING SUB-FRAME IN LATTER HALF OF A-MPDU1 FROM AP2

NO ↑

S16
IS AVERAGE ACCESS DELAY EQUAL TO OR LESS THAN FIRST THRESHOLD?

NO →

S17
DOES Non-AP MLD ACCOMMODATE CONTINUOUS TRANSMISSION OF BlockACK?

YES →

S18
TRANSMIT A-MPDU2 DESCRIBING NUMBER OF TRANSMISSIONS AND TRANSMISSION INTERVAL OF BlockACK FROM AP2

NO →

S19
TRANSMIT A-MPDU2 WITH REDUCED TRANSMISSION RATE FROM AP2

S16 YES →

S20
AFTER ACQUIRING TRANSMISSION RIGHT OF AP2, TRANSMIT A-MPDU2 FROM AP2 AFTER STANDING BY FOR INFORMATION SHARING DELAY OF Non-AP MLD + DIFFERENCE IN TRANSMISSION RIGHT ACQUISITION TIMES BETWEEN AP1 AND AP2

END

WIRELESS COMMUNICATION APPARATUS AND METHOD

CROSS-REFERENCE TO RELATED APPLICATIONS

The present application is based on PCT filing PCT/JP2021/034239, filed Sep. 17, 2021, which claims priority to Japanese Application No. 2020-167502, filed Oct. 2, 2020, the entire contents of each are incorporated herein by reference.

TECHNICAL FIELD

The present technique relates to a wireless communication apparatus and a method, and particularly relates to a wireless communication apparatus and a method that enable communication quality to be improved.

BACKGROUND ART

Methods of accommodating demands for high transmission rates such as 8K transmission and XR (X Reality) include wireless communication (Multi-Link Operation: MLO) using a plurality of links. In addition, in an unlicensed band, it is necessary to perform Listen Before Talk to check whether the band is being used before transmission. Therefore, transmission timings may differ among the plurality of links.

Generally, a receiving side of data notifies a transmitting side of a reception success/failure of the data by transmitting an acknowledgment signal of the data. On the other hand, the transmitting side of data may fail to receive the acknowledgment signal itself and may retransmit unnecessary data.

By comparison, in communication using a plurality of links, reception success/failure information indicating a reception success/failure of data of each link is shared among the links and an acknowledgment signal including the shared reception success/failure information is transmitted. Accordingly, redundancy can be imparted to the acknowledgment signal and retransmissions of the unnecessary data described above can be reduced.

However, when transmission timings differ among the plurality of links or when a delay occurs upon sharing reception success/failure information among the links, sharing of other pieces of reception success/failure information has not been completed at a time point of transmission of an acknowledgment signal and redundancy of the acknowledgment signal cannot be secured.

PTL 1 describes a method of improving a probability of success of transmission by setting an appropriate transmission rate of an acknowledgment signal. However, in a band under heavy interference, the probability of success does not increase even when the transmission rate is appropriately set, and sharing of reception success/failure information in communication using a plurality of bands is not taken into consideration.

NPL 1 discloses, in communication using a plurality of links, sharing reception success/failure information of data of each link among the links and notifying the sharing of reception success/failure information of other links at each link. However, the notifications are limited to information of which sharing has been completed and there is no description of accommodating cases where sharing of other pieces of reception success/failure information is incomplete.

CITATION LIST

Patent Literature

[PTL 1]
JP 2006-352711 A

Non Patent Literature

[NPL 1]
Abhishek Patil, George Cherian, Duncan Ho, Alfred Asterjadhi, "MLO: Acknowledgement Procedure", [online], Jan. 6, 2020, IEEE, [retrieved Jul. 31, 2020], Internet, <URL: https://mentor.ieee.org/802.11/documents>

SUMMARY

Technical Problem

As described above, when transmission timings differ among a plurality of links or when a delay occurs upon sharing reception success/failure information among the links, it is difficult to secure redundancy of an acknowledgment signal.

The present technique was devised in view of such a situation to enable communication quality to be improved.

Solution to Problem

A wireless communication apparatus according to a first aspect of the present technique includes: a first communicating portion configured to perform communication using a first link; a second communicating portion configured to perform communication using a second link; and a communication control portion configured to perform allocation control of allocating transmission data to first data and second data, transmission control of controlling transmission of the first data using the first link and transmission of the second data using the second link, and reception control of controlling reception using the first link of a first response including reception success/failure information indicating a success/failure of reception with respect to the first data and at least a part of the second data and reception using the second link of a second response including the reception success/failure information indicating a success/failure of reception with respect to the second data and at least a part of the first data.

A wireless communication apparatus according to a second aspect of the present technique includes: a first communicating portion configured to perform communication using a first link; a second communicating portion configured to perform communication using a second link; and a communication control portion configured to perform reception control of controlling reception of first data using the first link and reception of second data using the second link and transmission control of controlling transmission using the first link of a first response including reception success/failure information indicating a success/failure of reception with respect to the first data and at least a part of the second data and transmission using the second link of a second response including the reception success/failure information indicating a success/failure of reception with respect to the second data and at least a part of the first data.

In the first aspect of the present technique, communication is performed using a first link and communication is performed using a second link. In addition, allocation control of allocating transmission data to first data and second data, transmission control of controlling transmission of the first data using the first link and transmission of the second data using the second link, and reception control of controlling reception using the first link of a first response including reception success/failure information indicating a success/failure of reception with respect to the first data and at least a part of the second data and reception using the second link of a second response including the reception success/failure information indicating a success/failure of reception with respect to the second data and at least a part of the first data are performed.

In the second aspect of the present technique, communication is performed using a first link and communication is performed using a second link. In addition, reception control of controlling reception of first data using the first link and reception of second data using the second link and transmission control of controlling transmission using the first link of a first response including reception success/failure information indicating a success/failure of reception with respect to the first data and at least a part of the second data and transmission using the second link of a second response including the reception success/failure information indicating a success/failure of reception with respect to the second data and at least a part of the first data are performed.

BRIEF DESCRIPTION OF DRAWINGS

FIG. 8 is a flowchart illustrating selection processing of a sequence.

DESCRIPTION OF EMBODIMENTS

Modes for implementing the present technique will be described below. The description will be given in the following order.

0. Configuration example of system and apparatus
1. First embodiment (decoding in sub-frame units enabled)
2. Second embodiment (decoding in sub-frame units disabled)
3. Others

0. Configuration Example of System and Apparatus

Configuration Example of Communication System

Figure 1:
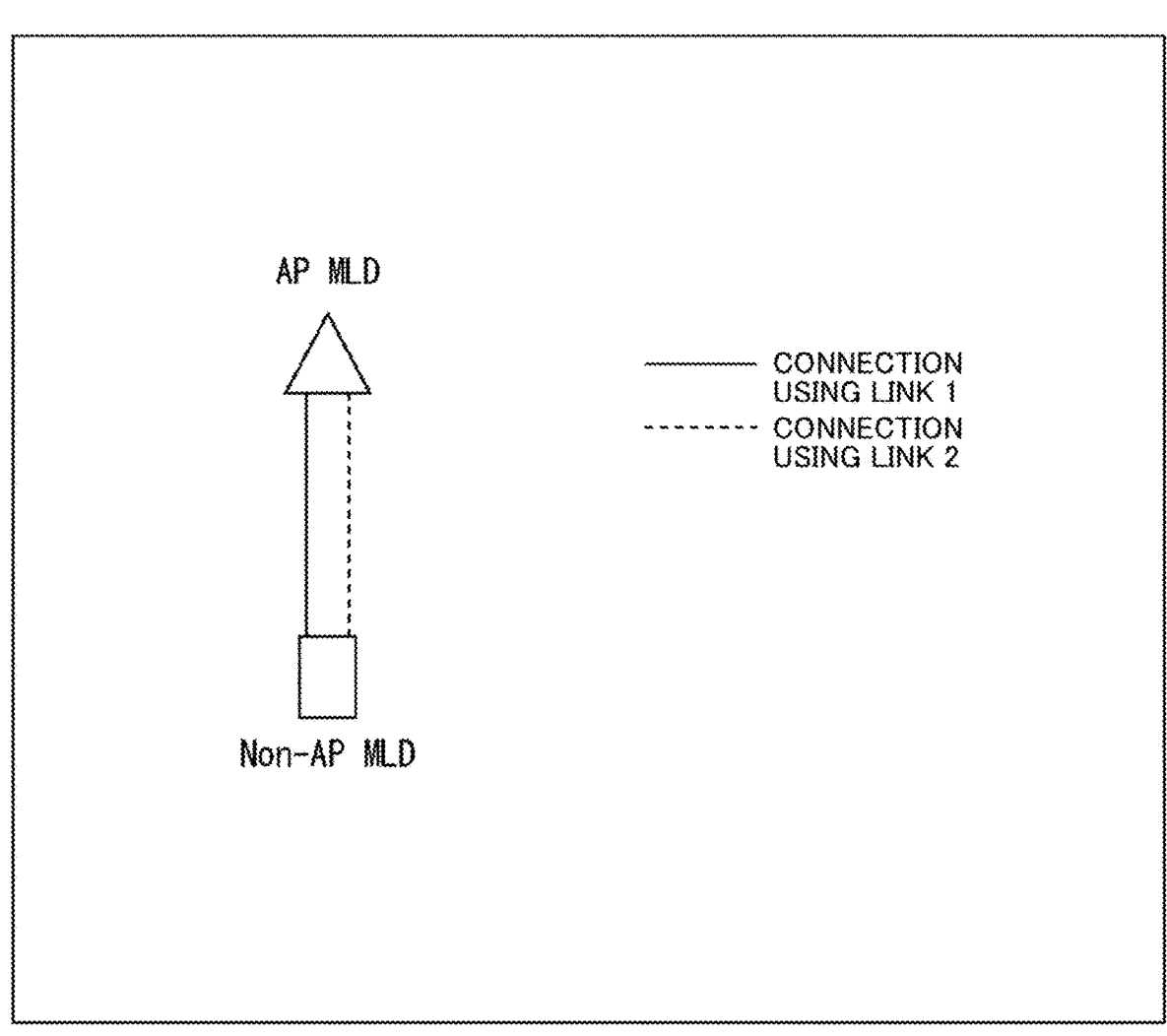
FIG. 1 is a diagram showing a configuration example of a communication system according to the present technique.

FIG. 1 is a diagram showing a configuration example of a communication system according to an embodiment of the present technique.

The communication system shown in FIG. 1 is constituted of an AP MLD (Multi-link Device) and a Non-AP MLD.

The AP MLD is a communication apparatus that corresponds to a base station that accommodates a Multi-link Operation (MLO). The Non-AP MLD is a communication apparatus that corresponds to a terminal that accommodates an MLO. The Non-AP MLD is connected to the AP MLD. In FIG. 1, a solid line and a dashed line connecting the AP MLD and the Non-AP MLD to each other respectively represent connections by different links. When there are no cases of distinguishing the AP MLD and the Non-AP MLD from each other, the AP MLD and the Non-AP MLD will also be simply referred to as MLDs.

Note that a "link" as used in the present specification refers to a wireless transmission path that enables data to be transmitted between two communication apparatuses.

Each link is selected from, for example, a plurality of wireless transmission paths which are divided by frequency bands and which are mutually independent. For example, channels respectively selected from a plurality of channels included in any of bands among frequency bands such as a 2.4 GHz band, a 5 GHz band, a 6 GHz band, and a 920 MHz band are used.

The two links used in the communication system shown in FIG. 1 may be two channels selected from a same frequency band or two channels selected from different frequency bands. In addition, the links used between the AP MLD and the Non-AP MLD are not limited to two and communication may be performed using three or more links.

Configuration Example of Wireless Communication Apparatus

Figure 2:
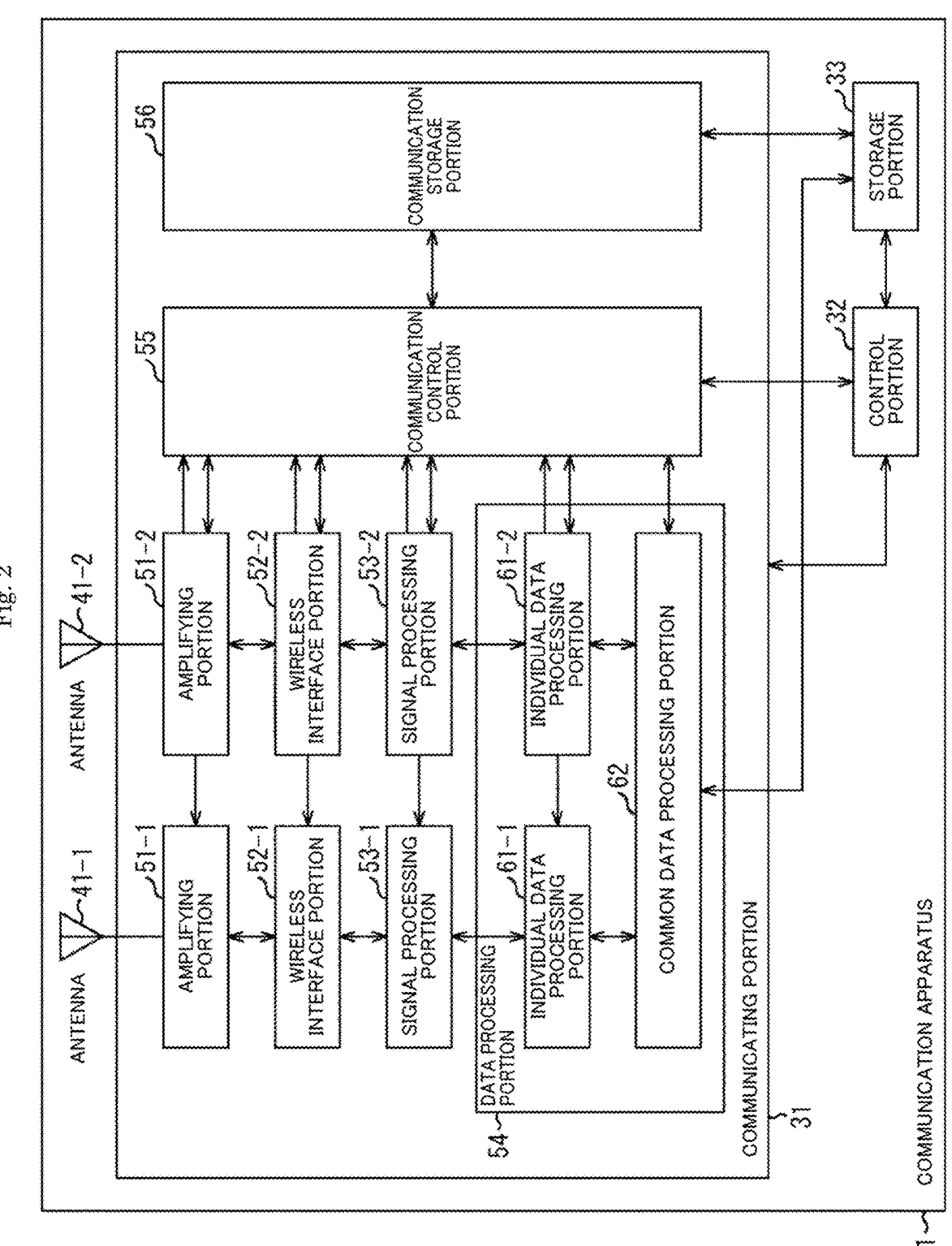
FIG. 2 is a block diagram showing a configuration example of a wireless communication apparatus.

FIG. 2 is a block diagram showing a configuration example of a wireless communication apparatus.

A communication apparatus 11 shown in FIG. 2 is a wireless communication apparatus that operates as the AP MLD or the Non-AP MLD.

The communication apparatus 11 is constituted of a communicating portion 31, a control portion 32, a storage portion 33, and antennas 41-1 and 41-2. The antennas 41-1 and 41-2 will be collectively referred to as an antenna 41 when there is no need to distinguish the antennas.

The communicating portion 31 includes circuitry that transmits and receives data. The communicating portion 31 is configured to include amplifying portions 51-1 and 51-2, wireless interface portions 52-1 and 52-2, and signal processing portions 53-1 and 53-2. In addition, the communicating portion 31 is configured to include a data processing portion 54, a communication control portion 55, and a communication storage portion 56.

The amplifying portions 51-1 and 51-2, the wireless interface portions 52-1 and 52-2, and the signal processing portions 53-1 and 53-2 will be respectively collectively referred to as an amplifying portion 51, a wireless interface portion 52, and a signal processing portion 53 when there is no need to distinguish the amplifying portions, the wireless interface portions, and the signal processing portions.

During transmission, the amplifying portion 51 amplifies an analog signal supplied from the wireless interface portion 52 to a predetermined power, and outputs the power-amplified analog signal to the antenna 41. During reception, the amplifying portion 51 amplifies an analog signal supplied from the antenna 41 to a predetermined power, and outputs the power-amplified analog signal to the wireless interface portion 52.

At least a part of functions of the amplifying portion 51 may be included in the wireless interface portion 52. In addition, at least a part of the functions of the amplifying portion 51 may be a constituent element outside the communicating portion 31.

During transmission, the wireless interface portion 52 converts a transmission symbol stream from the signal processing portion 53 into an analog signal, performs filtering, up-conversion to a carrier frequency, and phase control, and outputs the analog signal after the phase control to the amplifying portion 51.

During reception, the wireless interface portion 52 performs phase control, down-conversion, and reverse filtering on an analog signal supplied from the amplifying portion 51, and outputs a reception symbol stream representing a result of a conversion to a digital signal to the signal processing portion 53.

During transmission, the signal processing portion 53 performs signal processing for spatial separation on a data symbol stream supplied from the data processing portion 54 as necessary, and outputs one or more transmission symbol streams obtained as a result of the signal processing to each wireless interface portion 52.

During reception, the signal processing portion 53 performs signal processing on a reception symbol stream supplied from each wireless interface portion 52, spatially separates the stream as necessary, and outputs a data symbol stream obtained as a result of the spatial separation to the data processing portion 54.

The data processing portion 54 is constituted of individual data processing portions 61-1 and 61-2 and a common data processing portion 62. The individual data processing portions 61-1 and 61-2 will be collectively referred to as an individual data processing portion 61 when there is no need to distinguish the individual data processing portions.

During transmission, the individual data processing portion 61 performs a channel access operation based on carrier sensing, addition of a MAC (Media Access Control) header and an error-detecting code to data to be transmitted, and connection processing of a plurality of data units.

During reception, the individual data processing portion 61 performs disconnection processing of a MAC header, analysis and error detection, and a repeat request operation of a received data unit.

During transmission, the common data processing portion 62 performs sequence management of data held in the communication storage portion 56 and control information and management information received from the communication control portion 55. In addition, the common data processing portion 62 performs encryption processing or the like of the control information and the management information to generate a data unit and allocates the generated data unit to the individual data processing portions 61-1 and 61-2.

During reception, the common data processing portion 62 performs decipher processing and reorder processing of a data unit.

Note that operations of the individual data processing portion 61 and the common data processing portion 62 are not limited to the operations described above and, for example, one may perform operations of the other.

The communication control portion 55 performs control of operations of each portion and information transmission between portions of the communicating portion 31. In addition, the communication control portion 55 performs control to deliver, to the individual data processing portion 61 and the common data processing portion 62, control information and management information to be notified to another communication apparatus.

In the present technique, the communication control portion 55 controls each portion of the communicating portion 31 so that reception success/failure information of data straddling a plurality of links is included in a BlockAck (hereinafter, referred to as a BA) in a Multi-link operation (MLO). The reception success/failure information is information indicating a success/failure of reception that is shared in an MLD. The BA is an acknowledgment signal to be transmitted from a Non-AP MLD to an AP MLD. For example, control of each portion of the communicating portion 31 includes allocation control of data to each link, data transmission control using each link, and data reception control using each link.

The communication storage portion 56 holds information used by the communication control portion 55. In addition, the communication storage portion 56 holds data to be transmitted and data having been received.

The control portion 32 is constituted of circuitry that includes a CPU (Central Processing Unit), a ROM (Read-Only Memory), a RAM (Random Access Memory), and the like. The control portion 32 executes a program stored in the ROM or the like, and controls the communicating portion 31 and the communication control portion 55. In addition, the control portion 32 may perform a part of operations of the communication control portion 55 in place of the communication control portion The storage portion 33 holds information used by the communicating portion 31 and the control portion 32. In addition, the storage portion 33 may perform a part of operations of the communication storage portion 56 in place of the communication storage portion 56. The storage portion 33 and the communication storage portion 56 may be configured as one block.

For example, the antennas 41, the amplifying portions 51, the wireless interface portions 52, the signal processing portions 53, and the individual data processing portions 61 having a same branch number constitute, for each branch number, one set. Each set becomes constituent elements of the communication apparatus 11 and performs wireless communication using each link. In addition, each set may include the storage portion 33.

For example, each set becomes one AP or one STA. An AP corresponds to an apparatus that corresponds to a base station and is a block which performs wireless communication using each link. An STA corresponds to an apparatus that corresponds to a terminal and is a block which performs wireless communication using each link.

Note that a link refers to a wireless transmission path that enables data to be transmitted between two or more communication apparatuses 11 and each link used by each set may have a different frequency band. In addition, the signal processing portions 53 and the individual data processing portions 61 having a same branch number may constitute, for each branch number, one set, and a configuration may be adopted in which two sets or three or more sets of the signal processing portions 53 and the individual data processing portions 61 having the same branch number are connected to one wireless interface portion 52.

The antennas 41, the amplifying portions 51, and the wireless interface portions 52 having a same branch number may constitute, for each branch number, one set and, in addition to two sets, three or more sets may become constituent elements of the communication apparatus 11. In addition, the communicating portion 31 is realized by one or more LSIs.

The individual data processing portion 61 is also referred to as a Lower MAC. The common data processing portion 62 is also referred to as an Upper MAC or a Higher MAC. In addition, a set of the individual data processing portion 61 and the common data processing portion 62 is referred to as an AP entity or a Non-AP entity. Furthermore, the communication control portion 55 is also referred to as an MLD management entity.

1. First Embodiment (Decoding in Sub-Frame Units Enabled)

As a first embodiment, an example of a case where a terminal of A-MPDU performs decoding for each A-MPDU sub-frame (hereinafter, also simply referred to as data) will be described.

Hereinafter, first, each sequence in which the AP-MLD collects information from the Non-AP MLD and terminals in the periphery and redundancy of an acknowledgment signal is secured based on the information will be described. Finally, a specific example of selecting an optimum sequence from the sequences will be described.

Figure 3:
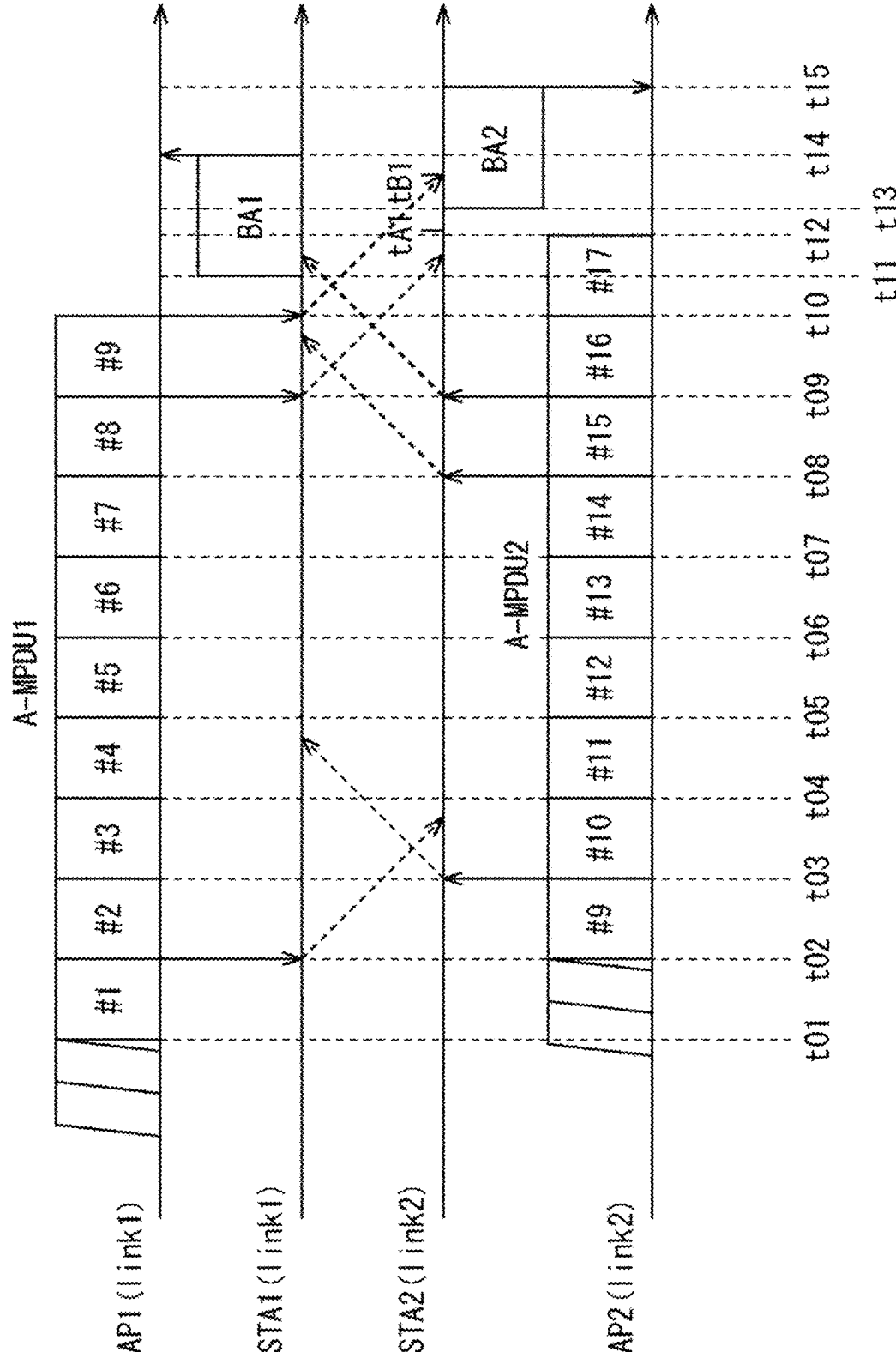
FIG. 3 is a diagram showing a first sequence of wireless communication according to a first embodiment.

First Sequence Example of Wireless Communication According to First Embodiment FIG. 3 is a diagram showing a first sequence for explaining a series of operations of wireless communication according to the first embodiment.

FIG. 3 shows a sequence when data of which reception success/failure information to be shared in an MLD cannot be shared on time is to be also transmitted using another link.

AP1 denotes a block that performs an operation of wireless communication using a first link (link 1) in the AP MLD, and AP2 denotes a block that performs an operation of wireless communication using a second link (link 2) in the AP MLD. STA1 denotes a block that performs an operation of wireless communication using the first link (link 1) in the Non-AP MLD, and STA2 denotes a block that performs an operation of wireless communication using the second link (link 2) in the Non-AP MLD.

In FIG. 3, a square represents a frame to be actually transmitted and a parallelogram represents a random standby time due to a back-off or the like. A solid arrow represents a frame exchange in a link between an AP and an STA, and a dashed arrow represents an information exchange inside each MLD (in the case of FIG. 3, the Non-AP MLD). An abscissa represents time. In FIG. 3, particularly, a time of day tA1 represents a time of day at which the STA2 generates BA2 that is an acknowledgment signal. A time of day tB1 represents a time of day at which the STA2 receives reception success/failure information of data #9 from the STA1.

For example, the AP MLD and the Non-AP MLD exchange propriety information of sharing of reception success/failure information in each MLD upon connection or the like, information with respect to a delay time when sharing information in each MLD, and information with respect to a decoding method of A-MPDU.

First, by performing a back-off or the like, at a time of day t01, the AP1 acquires a transmission right and starts data transmission (A-MPDU1) to the STA1. A-MPDU1 is made up of pieces of data #01 to data #09.

Specifically, the AP1 transmits data #01 at the time of day t01, transmits data #02 at a time of day t02, transmits data #03 at a time of day t03, transmits data #04 at a time of day t04, and transmits data #05 at a time of day t05. In addition, the AP1 transmits data #06 at a time of day t06, transmits data #07 at a time of day t07, transmits data #08 at a time of day t08, and transmits data #09 at a time of day t09.

The STA1 completes reception of data #1 at the time of day t02, completes reception of data #2 at the time of day t03, completes reception of data #3 at the time of day t04, completes reception of data #4 at the time of day t05, and completes reception of data #5 at the time of day t06. In addition, the STA1 completes reception of data #6 at the time of day t07, completes reception of data #7 at the time of day t08, and completes reception of data #8 at the time of day t09.

When the STA1 completes reception of data #09 being a last piece of data of A-MPDU1 at a time of day t10, the STA1 starts transmitting BA1 being an acknowledgment signal at a time of day t11 to the AP1. BA1 includes reception success/failure information of the pieces of data #1 to data #9 of A-MPDU1. The transmission of BA1 is completed at a time of day t14.

In addition, as information sharing in each MLD, upon receiving data #1 at the time of day t02, the STA1 shares reception success/failure information of data #1 with the STA2. Due to a delay time upon information sharing in an MLD, the STA2 receives the reception success/failure information of data #1 after the time of day t03 and before the time of day t04. While a description of reception success/failure information of the pieces of data #2 to data #7 will be omitted, the reception success/failure information is shared by the STA2 after a delay due to a delay time in a similar manner to the reception success/failure information of data #1. The same applies to subsequent drawings.

At the time of day t09, when reception of data #8 is completed, the STA1 shares reception success/failure information of data #8 with the STA2. Due to a delay time upon information sharing in an MLD, the STA2 receives the reception success/failure information of data #8 immediately after the time of day t11.

At the time of day t10, when reception of data #9 is completed, the STA1 shares reception success/failure information of data #9 with the STA2. Due to a delay time upon information sharing in an MLD, the STA2 receives the reception success/failure information of data #9 at the time of day tB1 which is a time of day between a time of day t13 and a time of day t14.

On the other hand, after the AP1 starts data transmission, by performing a back-off or the like, at the time of day t02, the AP2 acquires a transmission right and starts data transmission (A-MPDU2) to the STA2. In doing so, when transmitting nine pieces of data to the STA2 starting at the time of day t02, only the time of day tB1 at which the STA2 completes reception of the reception success/failure information of the data #9 will not be on time for the time of day tA1 at which the STA2 starts generation of BA2. In other words, the reception success/failure information of data #9 cannot be included in BA2 generated by the STA2.

In consideration thereof, the AP MLD sets the AP2 including data (data #9) of which reception success/failure information cannot be shared by the STA2 from STA1 before the time of day tA1 in A-MPDU2 and transmitting the data.

In other words, the AP MLD sets sub-frames in A-MPDU1 to be included in A-MPDU2 based on information with respect to a delay time upon information sharing in the Non-AP MLD being a destination, a transmission start time of the AP1, and a remaining back-off time of the AP2. At this point, in terms of a transmission order, the sub-frames (for example, the data #9) in A-MPDU1 are arranged at a position before sub-frames (for example, pieces of data #10 to data #17) originally included in A-MPDU2. In addition, the AP MLD may set the number of sub-frames in A-MPDU1 to be included in A-MPDU2 based on a size of a frame in a transmission queue.

According to the settings described above, at the time of day t02, the AP2 starts transmission of A-MPDU2 constituted of pieces of data #9 to data #17 including the data #9 being a sub-frame in A-MPDU1.

Specifically, the AP2 transmits data #09 at the time of day t02, transmits data #10 at the time of day t03, transmits data #11 at the time of day t04, transmits data #12 at the time of day t05, and transmits data #13 at the time of day t06. In addition, the AP2 transmits data #14 at the time of day t07, transmits data #15 at the time of day t08, transmits data #16 at the time of day t09, and transmits data #17 at the time of day t10.

The STA2 completes reception of data #9 at the time of day t03, completes reception of data #10 at the time of day t04, completes reception of data #11 at the time of day t05, completes reception of data #12 at the time of day t06, and completes reception of data #13 at the time of day t07. In addition, the STA2 completes reception of data #14 at the time of day t08, completes reception of data #15 at the time of day t09, and completes reception of data #16 at the time of day t10.

At the time of day t12, the STA2 starts generation of BA2 upon completing the reception of data #17 being a last piece of data of A-MPDU2 and, at the time of day t13, starts transmission of BA2 to the AP2. Note that BA2 includes reception success/failure information of the pieces of data #9 to data #17 of A-MPDU2 received by the STA2. The transmission of BA2 is completed at the time of day t15.

In addition, as information sharing in an MLD, at the time of day t03, when the STA2 receives the data #9, the STA2 shares the reception success/failure information of the data #9 with the STA1. Due to a delay time upon information sharing in an MLD, the STA1 receives the reception success/failure information of the data #9 immediately before the time of day t05. While a description of reception success/failure information of the pieces of data #10 to data #13 will be omitted, the reception success/failure information is shared by the AP1 after a delay due to a delay time in a similar manner to the reception success/failure information of data #9. The same applies to subsequent drawings.

At the time of day t08, when the STA2 completes reception of the data #14, the STA2 shares the reception success/failure information of the data #14 with the STA1. Due to a delay time upon information sharing in an MLD, the STA1 receives the reception success/failure information of the data #14 immediately before the time of day t10.

At the time of day t09, when the STA2 completes reception of the data #15, the STA2 shares the reception success/failure information of the data #15 with the STA1. Due to a delay time upon information sharing in an MLD, the STA1 receives the reception success/failure information of the data #15 immediately after the time of day t11 at which the STA1 starts transmission of BA1. While a description of reception success/failure information of the pieces of data #16 and data #17 will be omitted, the reception success/failure information is shared by the AP1 later than the time of day t11 being a time of day of transmission of BA1 due to a delay time in a similar manner to the reception success/failure information of data #15. The same applies to subsequent drawings.

In other words, BA1 to be transmitted from STA1 does not include reception success/failure information of the pieces of data #15 to data #17 among A-MPDU2 but includes reception success/failure information of the pieces of data #9 to data #14 among A-MPDU2.

While an example of transmitting one piece of data (data #9) using two links has been described in FIG. 3, a plurality of pieces of data (for example, the pieces of data #8 and data #9) may be transmitted using two links such as when reception success/failure information of data is not available on time.

As described above, in the first sequence, since data of a latter half of a link transmitted first is to be transmitted as data at the top of a link to be transmitted later, redundancy of a BA can be secured with respect to all of the pieces of data in A-MPDU1.

Accordingly, even with a communication apparatus implemented in such a manner that processing takes time, a BA can be reliably transmitted.

Second Sequence Example of Wireless Communication of First Embodiment

Figure 4:
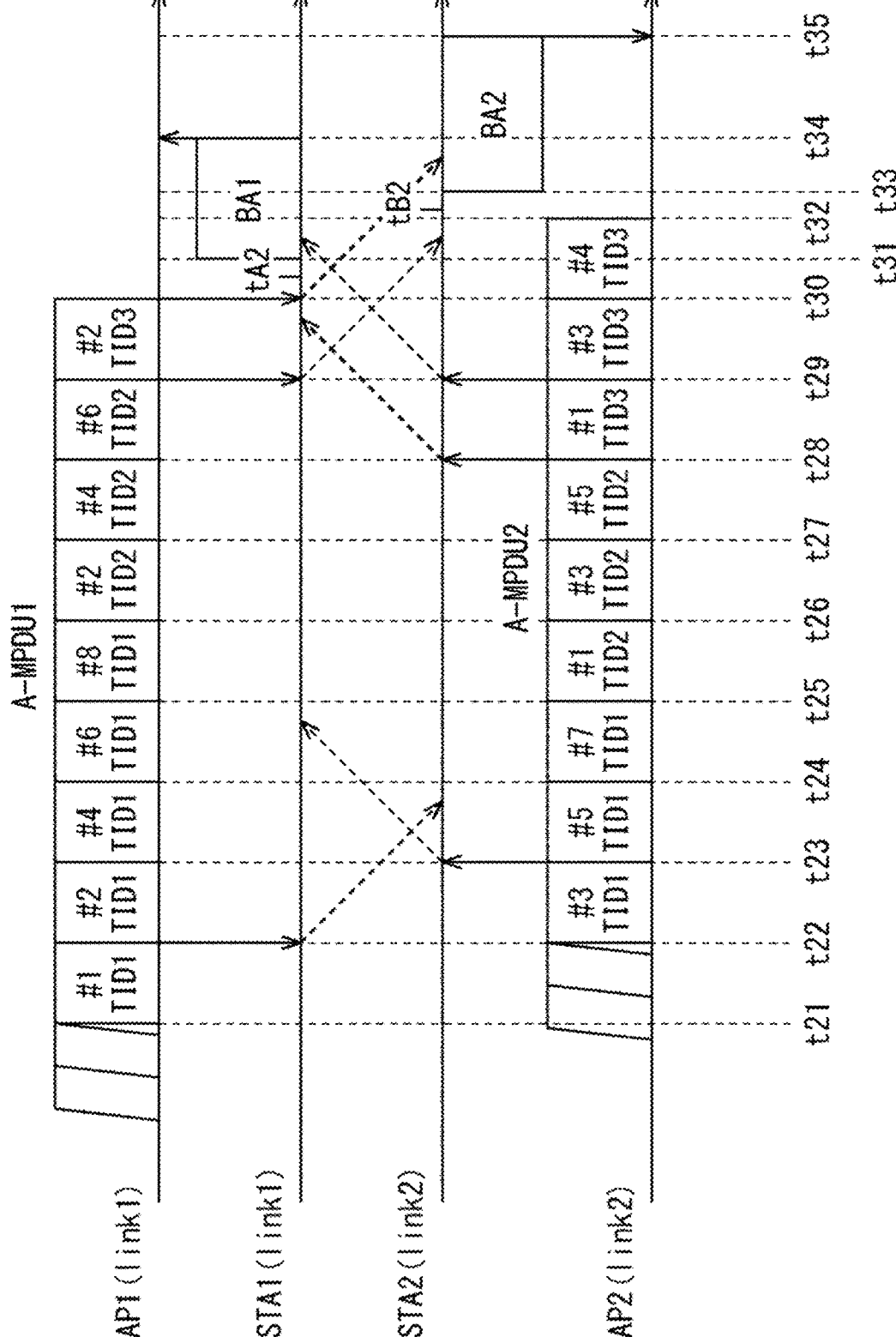
FIG. 4 is a diagram showing a second sequence of wireless communication according to the first embodiment.

FIG. 4 is a diagram showing a second sequence for explaining a series of operations of wireless communication according to the first embodiment.

Since portions of FIG. 4 that correspond to FIG. 3 are basically the same, a detailed description thereof will be omitted.

In addition, in FIG. 4, particularly, a time of day tA2 represents a time of day at which the STA1 starts generation of BA1. A time of day tB2 represents a time of day at which the STA2 starts generation of BA2.

FIG. 4 shows a sequence in which data of which reception success/failure information is shared on time is allocated to low-delay, high reliability data.

Data of a TID (Traffic Identifier) which is low-delay, high reliability data is data representing a high demand towards at least one of low delay and high reliability.

For example, data of a TID has priorities of TID1 to TID3, and among TID1, TID2, and TID3, TID1 represents a highest priority of a demand towards low delay and high reliability and TID3 represents a lowest priority of a demand towards low delay and high reliability.

A method in which an AP MLD transmits plurality of pieces of data of a TID by including the data in one A-MPDU is referred to as Multi-TID A-MPDU. In the case of Multi-TID A-MPDU, the AP MLD changes a data order in A-MPDU in accordance with the priorities of TIDs. In other words, the AP MLD configures A-MPDU1 and A-MPDU2 such that, when the AP1 and the AP2 transmit A-MPDU1 and A-MPDU2, pieces of data are aggregated (connected) in a descending order of priority of TID and the pieces of data are transmitted in a descending order of priority of TID.

Accordingly, with respect to data with a high priority of TID, a BA from an STA can be redundantly transmitted.

In FIG. 4, data is alternately allocated to A-MPDU1 and A-MPDU2 and aggregated in a descending order of priority from data 1 of the TID1. Accordingly, A-MPDU1 is constituted by data #1 of TID1, data #2 of TID1, data #4 of TID1, data #6 of TID1, data #8 of TID1, data #2 of TID2, data #4 of TID2, data #6 of TID2, and data #2 of TID3. A-MPDU2 is constituted by data #3 of TID1, data #5 of TID1, data #7 of TID1, data #1 of TID2, data #3 of TID2, data #5 of TID2, data #1 of TID3, data #3 of TID3, and data #4 of TID3.

By performing a back-off or the like, at a time of day t21, the AP1 acquires a transmission right and starts data transmission (A-MPDU1) to the STA1, and completes transmission at a time of day t30. Each piece of data of A-MPDU1 is transmitted in an order in which the data had been aggregated (an order from left to right in FIG. 4) at time of day t21 to time of day t29.

At a time of day t30, upon completing reception of data #2 of TID3 that is a last piece of data of A-MPDU1, at a time of day tA2, the STA1 generates BA1 and, at a time of day t31, the STA1 starts transmission of BA1 to the AP1. The transmission of BA1 is completed at a time of day t34.

On the other hand, after the AP1 starts data transmission, by performing a back-off or the like, at a time of day t22, the AP2 acquires a transmission right and starts data transmission (A-MPDU2) to the STA2, and completes transmission at a time of day t32. The pieces of data of A-MPDU2 are respectively transmitted in an order in which the data had been aggregated from the time of day t22 to the time of day t30.

At a time of day t32, upon completing reception of data #4 of TID3 that is a last piece of data of A-MPDU2, at a time of day tB2, the STA2 generates BA2 and, at a time of day t33, the STA2 starts transmission of BA2 to the AP2. The transmission of BA2 is completed at a time of day t35.

In addition, as information sharing in an MLD, upon completing reception of data #1 of TID1 at the time of day t22, the STA1 shares reception success/failure information of data #1 of TID1 with the STA2. Due to a delay time upon information sharing in an MLD, the STA2 receives the reception success/failure information of data #1 of TID1 after the time of day t23 and before the time of day t24.

At a time of day t29, when reception of data #6 of TID 2 is completed, the STA1 shares reception success/failure information of data #6 of TID2 with the STA2. Due to a delay time upon information sharing in an MLD, the STA2 receives the reception success/failure information of data #6 of TID2 immediately after the time of day t31 which precedes the time of day tB2 at which BA2 is generated.

When the STA1 completes reception of data #2 of TID3 at the time of day t30, the STA1 shares reception success/failure information of data #2 of TID 3 with the STA2. Due to a delay time upon information sharing in an MLD, the STA2 receives the reception success/failure information of data #2 of TID3 at a time of day between the time of day t33 and the time of day t34 which is after the time of day tB2 at which the STA2 generates BA2.

In other words, BA2 transmitted from the STA2 includes reception success/failure information of data #1 of TID1 to data #6 of TID2.

In a similar manner, as information sharing in an MLD, upon completing reception of data #3 of TID at the time of day t23, the STA2 shares reception success/failure information of data #3 of TID1 with the STA1. Due to a delay time upon information sharing in an MLD, the STA1 receives the reception success/failure information of data #3 of TID1 immediately before the time of day t25.

At a time of day t28, when reception of data #5 of TID 2 is completed, the STA2 shares reception success/failure information of data #5 of TID2 with the STA1. Due to a delay time upon information sharing in an MLD, the STA1 receives the reception success/failure information of data #5 of TID2 immediately before the time of day t30 which precedes the time of day tB2 at which the STA1 generates BA1.

When the STA2 completes reception of data #1 of TID3 at the time of day t29, the STA2 shares reception success/failure information of data #1 of TID 3 with the STA1. Due to a delay time upon information sharing in an MLD, the STA1 receives the reception success/failure information of data #1 of TID3 at a time of day after the time of day t31 which is after the time of day tA2 at which the STA1 generates BA1.

In other words, BA1 to be transmitted from STA1 does not include reception success/failure information of data #1 of TID3 and subsequent pieces of data but includes reception success/failure information of data #3 of TID1 to data #5 of TID2.

Accordingly, the STA2 is able to share reception success/failure information with respect to all of the pieces of data of TID1 and TID2 in A-MPDU2 with the STA1 before the time of day tA2 at which the STA1 starts generation of a BA with respect to A-MPDU1. In addition, the STA1 is able to share reception success/failure information with respect to all of the pieces of data of TID1 and TID2 in A-MPDU1 with the STA2 before the time of day tB2 at which the STA2 starts generation of a BA with respect to A-MPDU2.

In this case, for example, data of TIDs may belong to different access categories. Access categories are classified into: 1. Voice; 2. Video; 3. Best Effort; and 4. Back Ground, with 1 being a high priority and 4 being a low priority. When access categories differ between TIDs, control may be performed so that traffic of an access category with a high priority is aggregated at the top. As a result, the reception success/failure information of all of the pieces of data of TID1 and TID2 are included in BA1 and BA2. Accordingly, reliability of data of TID1 and TID2 can be improved.

As described above, in the second sequence, since a delay request or high-priority data is transmitted by being arranged in the front of an A-MPDU, an ACK with respect to the delay request or high-priority data can be transmitted using a plurality of links. Accordingly, since a redundancy of the ACK can be improved, unnecessary retransmissions due to a failed ACK which may cause a delay can be reduced.

Third Sequence Example of Wireless
Communication According to First Embodiment

Figure 5:
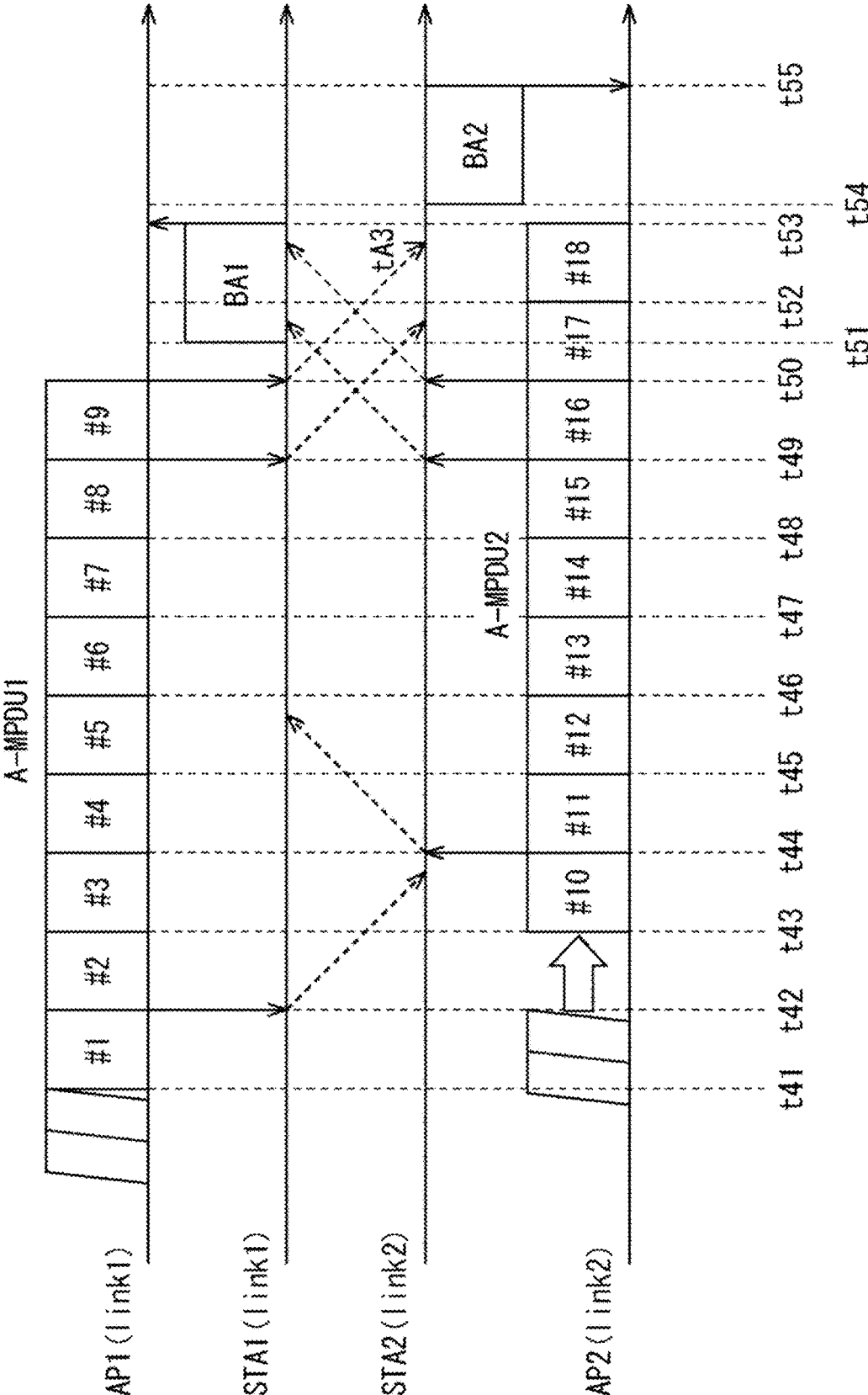
FIG. 5 is a diagram showing a third sequence of wireless communication according to the first embodiment.

FIG. 5 is a diagram showing a third sequence for explaining a series of operations of wireless communication according to the first embodiment.

Since portions of FIG. 5 that correspond to FIG. 3 are basically the same, a detailed description thereof will be omitted.

In addition, in FIG. 5, particularly, a time of day tA3 is a time of day at which the STA1 completes sharing of reception success/failure information with respect to all of the pieces of data of A-MPDU1 with the STA2.

FIG. 5 shows a sequence when delaying a time of day of an end of transmission of data so that reception success/failure information can be shared between links on time. In FIG. 5, start of transmission of data is put on hold in order to delay a time of day of the end of transmission of the data.

In other words, when the AP2 acquires a transmission right after the AP1 transmits A-MPDU1 and generation of BA2 by the STA2 upon transmission of A-MPDU2 is expected to take place before the time of day tA3 described above, the AP2 puts the transmission of A-MPDU2 on hold. In addition, the AP2 starts the transmission of A-MPDU2 at a time of day which causes generation of BA2 by the STA2 to take place after the time of day tA3.

Specifically, in FIG. 5, at a time of day t41, the AP1 acquires a transmission right and starts data transmission (A-MPDU1) to the STA1, and completes transmission at a time of day t50. A-MPDU1 is constituted of pieces of data #1 to data #9. The pieces of data of A-MPDU1 are respectively transmitted in an order of data (from left to right in FIG. 5) from the time of day t41 to a time of day t49.

At a time of day t50, when the STA1 completes reception of data #9 being a last piece of data of A-MPDU1, at a time of day t51, the STA1 starts transmission of BA1 to the AP1. The transmission of BA1 is completed at a time of day t53.

In addition, as information sharing in an MLD, upon completing reception of data #1 at the time of day t42, the STA1 shares reception success/failure information of data #1 with the STA2. Due to a delay time upon information sharing in an MLD, the STA2 receives the reception success/failure information of data #1 before the time of day t44.

At the time of day t49, when reception of data #8 is completed, the STA1 shares reception success/failure information of data #8 with the STA2. Due to a delay time upon information sharing in an MLD, the STA2 receives the reception success/failure information of data #8 immediately after the time of day t51.

At the time of day t50, when reception of data #9 is completed, the STA1 shares reception success/failure information of data #9 with the STA2. Due to a delay time upon information sharing in an MLD, the STA2 receives the reception success/failure information of data #9 at the time of day tA3 between a time of day t52 and a time of day t53.

On the other hand, after the AP1 starts data transmission, at the time of day t42, the AP2 acquires a transmission right and attempts to start data transmission (A-MPDU2) to the STA2. A-MPDU2 is made up of pieces of data #10 to data #18.

In doing so, when the AP2 expects generation of BA2 by the STA2 to take place before the time of day tA3 described above, the AP2 puts the transmission of A-MPDU2 on hold. In addition, the AP2 starts the transmission of A-MPDU2 at a time of day t43 which causes generation of BA2 by the STA2 to take place after the time of day tA3.

The pieces of data of A-MPDU2 are respectively transmitted in an order of data (from left to right in FIG. 5) from the time of day t43 to the time of day t52.

At the time of day t53, when the STA2 completes reception of data #18 being a last piece of data of A-MPDU2, at a time of day t54, the STA2 starts transmission of BA2 to the AP2. At this point, since the STA2 has already shared the reception success/failure information of data #9 with the STA1 at a time of day tA3 which is a time of day preceding the time of day t53, the reception success/failure information of the data #9 is included in BA2. The transmission of BA2 is completed at a time of day t55.

In addition, as information sharing in an MLD, upon completing reception of data #10 at the time of day t44, the STA2 shares reception success/failure information of data #10 with the STA1. Due to a delay time upon information sharing in an MLD, the STA1 receives the reception success/failure information of data #10 before the time of day t46.

At the time of day t49, when reception of data #15 is completed, the STA2 shares reception success/failure information of data #15 with the STA1. Due to a delay time upon information sharing in an MLD, the STA1 receives the reception success/failure information of data #15 immediately after the time of day t51. Therefore, the reception success/failure information of data #15 is not included in BA1.

At the time of day t50, when the STA2 receives data #16 being a last piece of data of A-MPDU2, the STA2 shares reception success/failure information of the data #16 with the STA2. Due to a delay time upon information sharing in an MLD, the STA2 receives the reception success/failure information of data #16 between the time of day t52 and the time of day t53. Therefore, the reception success/failure information of data #16 is not included in BA1.

According to the above, the reception success/failure information of all of the pieces of data in A-MPDU1 can be included in the BA2. At this point, BA1 includes reception success/failure information with respect to the pieces of data #10 to data #14 in A-MPDU2.

For example, when there are a large number of terminals in a periphery and it is expected that, by standing by after acquiring a transmission right, there is a high probability of another terminal starting transmission first and the transmission right being lost, a frame length of A-MPDU2 may be extended instead of putting transmission on hold. Accordingly, control can be performed so that generation of BA2 by the STA2 takes place after the time of day tA3.

The frame length of A-MPDU2 can be extended by, for example, lowering a transmission rate or applying padding.

As described above, in the third sequence, since data of a link to be transmitted later is delayed, a BA with respect to data subsequent to data transmitted first can be transmitted in a more reliable manner.

Figure 6:
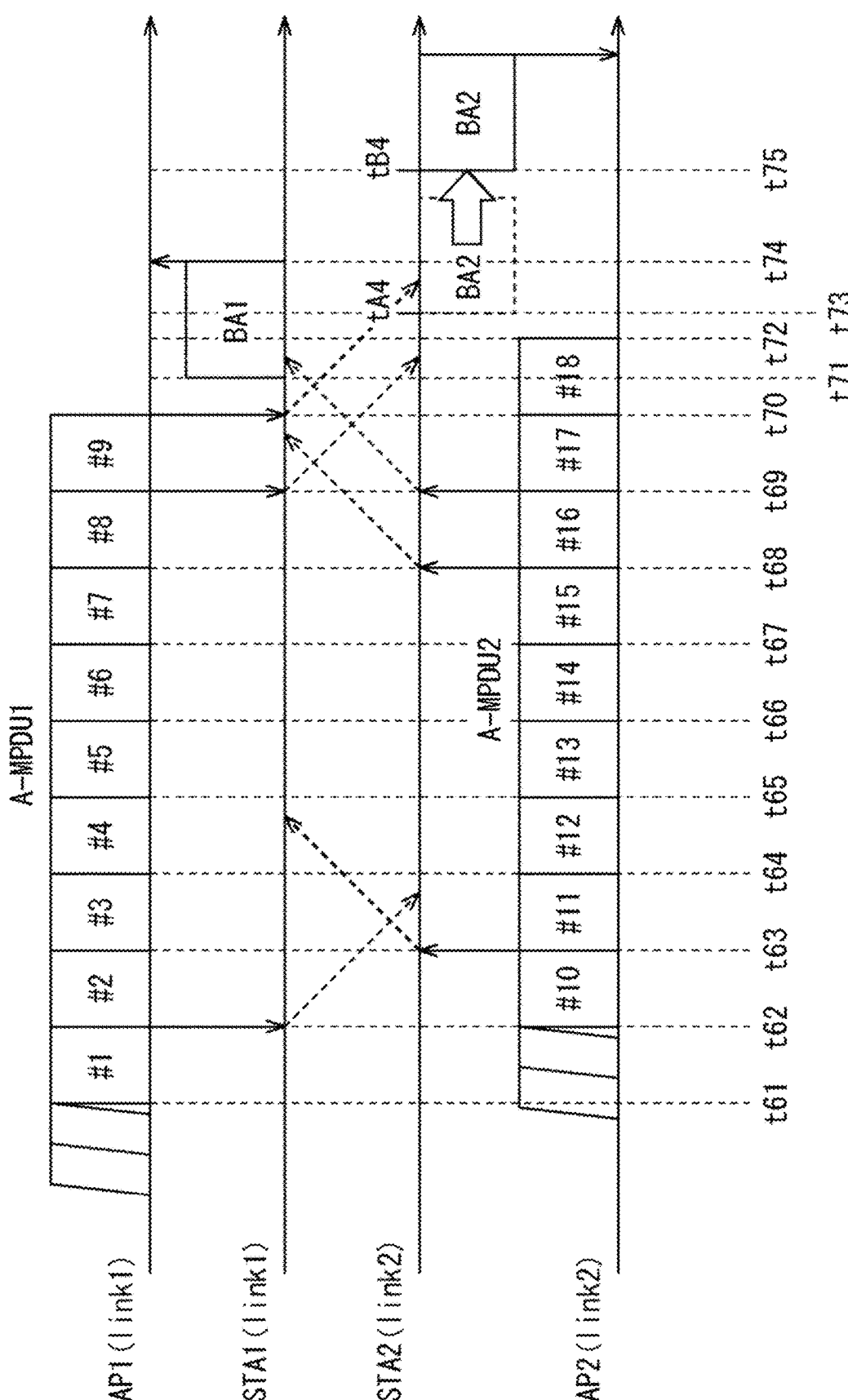
FIG. 6 is a diagram showing a fourth sequence of wireless communication according to the first embodiment.

Fourth Sequence Example of Wireless Communication According to First Embodiment FIG. 6 is a diagram showing a fourth sequence for explaining a series of operations of wireless communication according to the first embodiment.

Since portions of FIG. 6 that correspond to FIG. 3 are basically the same, a detailed description thereof will be omitted.

In addition, in FIG. 6, particularly, a time of day tA4 represents a time of day after a lapse of SIFS from reception of A-MPDU2 by the STA2 and at which transmission of BA2 is started, and a time of day tB4 represents a time of day at which the STA1 finishes sharing reception success/failure information of all of the pieces of data in A-MPDU1 with the STA2.

FIG. 6 shows a sequence when delaying a start of transmission of a BA so that reception success/failure information can be shared between links on time.

In other words, when the AP2 acquires a transmission right after the AP1 transmits A-MPDU1 and it is expected that, upon transmission of A-MPDU2, sharing of all pieces of reception success/failure information of data in A-MPDU1 by the STA1 with the STA2 is not completed by the time of day tA4 described above, the AP MLD delays start of transmission of BA2 by the AP2 until the time of day tB4.

Information instructing the STA2 to delay start of transmission of BA2 is described in A-MDPU2 and, for example, Control information for a Multi-link operation may be newly defined in an A-Control field in HT Control and the delay of start of transmission may be designated in the Control information. A time to be delayed (time of day tB4−time of day tA4) may be described in the information instructing the delay of the start of transmission.

Specifically, in FIG. 6, by performing a back-off or the like, at a time of day t61, the AP1 acquires a transmission right and starts data transmission (A-MPDU1) to the STA1, and completes transmission at a time of day t70. A-MPDU1 is constituted of pieces of data #1 to data #9. The pieces of data of A-MPDU1 are respectively transmitted in an order of data (from left to right in FIG. 6) from the time of day t61 to a time of day t69.

At the time of day t70, when the STA1 completes reception of data #9 being a last piece of data of A-MPDU1, at a time of day t71, the STA1 starts transmission of BA1 to the AP1.

In addition, as information sharing in an MLD, upon completing reception of data #1 at the time of day t62, the STA1 shares reception success/failure information of data #1 with the STA2. Due to a delay time upon information sharing in an MLD, the STA2 receives the reception success/failure information of data #1 before the time of day t64.

At the time of day t69, when reception of data #8 is completed, the STA1 shares reception success/failure information of data #8 with the STA2. Due to a delay time upon information sharing in an MLD, the STA2 receives the reception success/failure information of data #8 immediately after the time of day t71.

At the time of day t70, when reception of data #9 is completed, the STA1 shares reception success/failure information of data #9 with the STA2. Due to a delay time upon information sharing in an MLD, the STA2 receives the reception success/failure information of data #9 at a time of day between a time of day t73 and a time of day t74.

On the other hand, after the AP1 starts data transmission, by performing a back-off or the like, at the time of day t62, the AP2 acquires a transmission right and starts data transmission (A-MPDU2) to the STA2. A-MPDU2 is made up of pieces of data #10 to data #18.

In doing so, when it is expected that, at the time of day tA4 after a lapse of SIFS from a time of day of completion of transmission of the nine pieces of data to the STA2, sharing of reception success/failure information of the last piece of data #9 is not completed, the AP MLD delays transmission of BA2 by the STA2 until the time of day tB4.

The pieces of data of A-MPDU2 are respectively transmitted in an order of data (from left to right in FIG. 6) from the time of day t62 to the time of day t70.

At a time of day t72, the STA2 completes reception of data #18 being a last piece of data of A-MPDU2, and after sharing of reception success/failure information with respect to the data #9 between the time of day t73 and the time of day t74, at a time of day t75 that is the time of day tB4, the STA2 starts transmission of BA2 to the AP2.

Accordingly, the reception success/failure information with respect to all of the pieces of data in A-MPDU1 can be included in the BA1 and the BA2.

As information sharing in an MLD, at the time of day t63, when the STA2 completes reception of the data #1, the STA2 shares the reception success/failure information of the data #1 with the STA1. Due to a delay time upon information sharing in an MLD, the STA1 receives the reception success/failure information of data #1 before the time of day t65.

At the time of day t68, when reception of data #15 is completed, the STA2 shares reception success/failure information of data #15 with the STA1. Due to a delay time upon information sharing in an MLD, the STA1 receives the reception success/failure information of data #15 before the time of day t70.

At the time of day t69, when reception of data #16 is completed, the STA2 shares reception success/failure information of data #16 with the STA1. Due to a delay time upon information sharing in an MLD, the STA1 receives the reception success/failure information of the data #16 at a time of day immediately after the time of day t71.

Therefore, while the BA1 transmitted at the time of day t71 includes the reception success/failure information of the pieces of data #10 to data #15, the BA1 does not include the reception success/failure information of the data #16.

As described above, in the fourth sequence, since a time of day of start of transmission of BA in one link is delayed until a timing at which reception of a final piece of data in another link can be confirmed, BA of the other link can be reliably transmitted.

Figure 7:
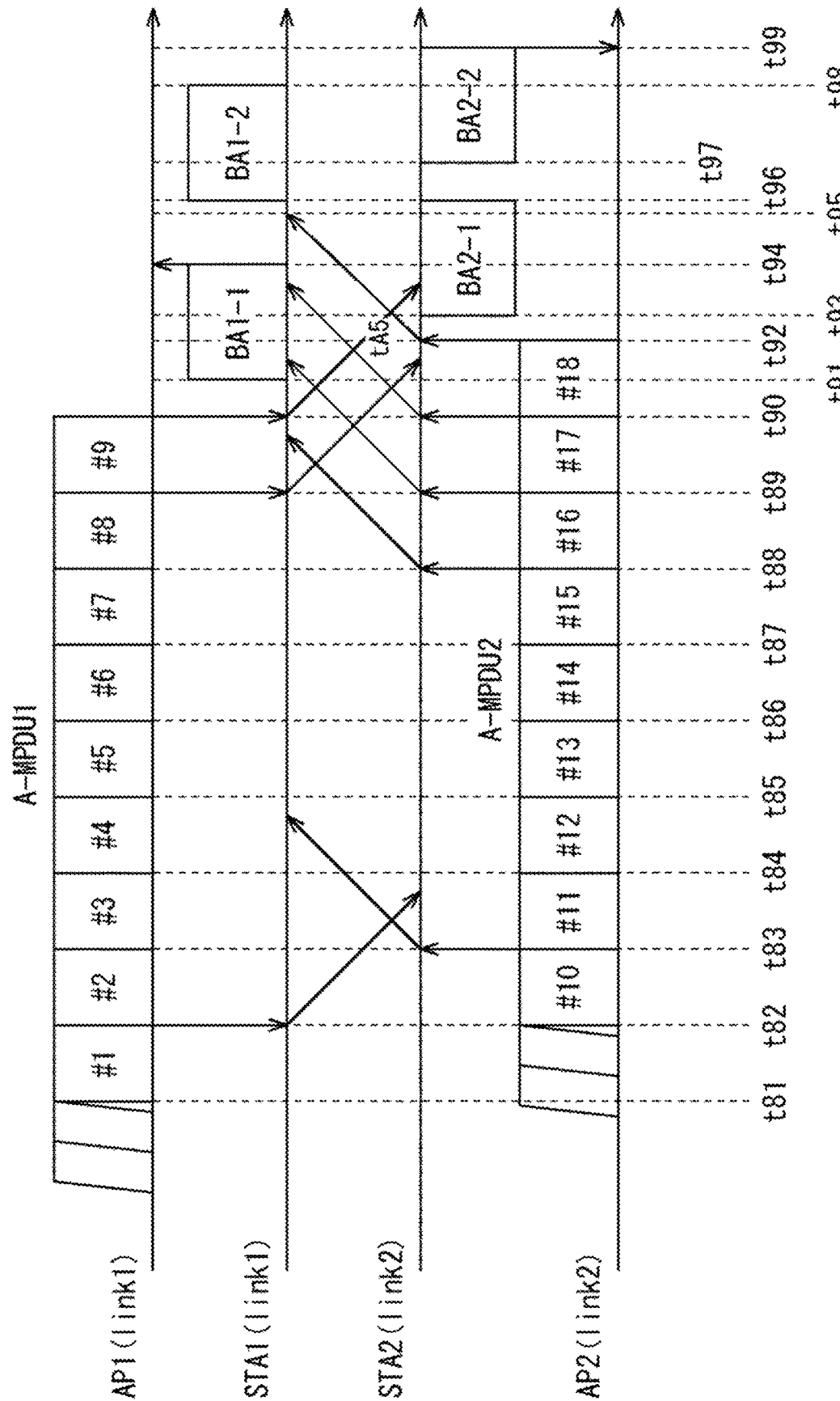
FIG. 7 is a diagram showing a fifth sequence of wireless communication according to the first embodiment.

Fifth Sequence Example of Wireless Communication According to First Embodiment FIG. 7 is a diagram showing a fifth sequence for explaining a series of operations of wireless communication according to the first embodiment.

Since portions of FIG. 7 that correspond to FIGS. 3 to 6 are basically the same, a detailed description thereof will be omitted.

In addition, in FIG. 7, particularly, a time of day tA5 represents a time of day at which the STA2 completes reception of A-MPDU2.

FIG. 7 shows a sequence of transmitting BA a plurality of times when reception success/failure information is not shared between links on time.

In other words, when reception success/failure information is not shared between links on time, the reception success/failure information may be shared between the links by transmitting BA a plurality of times as shown in FIG. 7 instead of delaying the transmission of BA as shown in FIG. 6.

In this case, since reception success/failure information of which sharing of information has not been completed at the time of generation of a first BA can be included at the time of transmission of a second BA, a BA including the reception success/failure information with respect to all of the pieces of data in A-MPDU1 and A-MPDU2 can be transmitted.

To describe the case of FIG. 7 in specific terms, at a time of day t81, the AP1 acquires a transmission right and starts data transmission (A-MPDU1) to the STA1, and completes transmission at a time of day t90. A-MPDU1 is constituted of pieces of data #1 to data #9. The pieces of data of A-MPDU1 are respectively transmitted in an order of data (from left to right in FIG. 7) from the time of day t81 to a time of day t89.

At the time of day t90, when the STA1 completes reception of data #9 being a last piece of data of A-MPDU1, at a time of day t91, the STA1 starts transmission of BA1-1 to the AP1 and completes the transmission of BA1-1 at a time of day t94. In addition, at a time of day t96, the STA1 starts transmission of BA1-2 to the AP1 and completes the transmission of BA1-2 at a time of day t98.

In addition, as information sharing in an MLD, upon completing reception of data #1 at the time of day t82, the STA1 shares reception success/failure information of data #1 with the STA2. Due to a delay time upon information sharing in an MLD, the STA2 receives the reception success/failure information of data #1 before the time of day t84. While a description of reception success/failure information of the pieces of data #2 to data #7 will be omitted, the reception success/failure information is shared after a delay due to a delay time in a similar manner to the reception success/failure information of data #1.

At the time of day t89, when reception of data #8 is completed, the STA1 shares reception success/failure information of data #8 with the STA2. Due to a delay time upon information sharing in an MLD, the STA2 receives the reception success/failure information of data #8 immediately after the time of day t91.

At the time of day t90, when reception of data #9 is completed, the STA1 shares reception success/failure information of data #9 with the STA2. Due to a delay time upon information sharing in an MLD, the STA2 receives the reception success/failure information of data #9 at a time of day between a time of day t93 and a time of day t94.

On the other hand, after AP1 starts data transmission, at a time of day t82, the AP2 acquires a transmission right and starts data transmission (A-MPDU2) to the STA2. A-MPDU2 is constituted of pieces of data #10 to data #18. The pieces of data of A-MPDU2 are respectively transmitted in an order of data (from left to right in FIG. 7) from the time of day t82 to the time of day t90.

At a time of day t92, when the STA2 completes reception of data #18 being a last piece of data of A-MPDU2, at a time of day t93, the STA2 starts transmission of BA2-1 to the AP2 and completes the transmission of BA2-1 at a time of day t96. Subsequently, at a time of day t97, the STA2 starts transmission of BA2-2 to the AP2, and at a time of day t99, the STA2 ends the transmission of BA2-2.

As described above, since the STA2 transmits BA2-1 at the time of day t93, the reception success/failure information of the pieces of data #1 to data #8 can be included in BA2-1. In addition, since the STA2 transmits BA2-2 at the time of day t97, the reception success/failure information of the data #9 can be included in BA2-2.

In addition, as information sharing in an MLD, upon completing reception of data #10 at the time of day t83, the STA2 shares reception success/failure information of data #10 with the STA1. Due to a delay time upon information sharing in an MLD, the STA1 receives the reception success/failure information of data #10 before the time of day t85.

At the time of day t88, when reception of data #15 is completed, the STA2 shares reception success/failure information of data #15 with the STA1. Due to a delay time upon information sharing in an MLD, the STA1 receives the reception success/failure information of data #15 before time of day t90.

At the time of day t89, when reception of data #16 is completed, the STA2 shares reception success/failure information of data #16 with the STA1. Due to a delay time upon information sharing in an MLD, the STA1 receives the reception success/failure information of data #16 immediately after the time of day t91.

At the time of day t90, when reception of data #17 is completed, the STA2 shares reception success/failure information of data #17 with the STA1. Due to a delay time upon information sharing in an MLD, the STA2 receives the reception success/failure information of data #17 at a time of day between a time of day t93 and a time of day t94.

At the time of day t92, when reception of data #18 is completed, the STA2 shares reception success/failure information of data #18 with the STA1. Due to a delay time upon information sharing in an MLD, the STA2 receives the reception success/failure information of data #18 at the time of day t95.

In this case, as described above, since the STA1 transmits BA1-2 at the time of day t91, reception success/failure information of the pieces of data #10 to data #15 can be included in BA1-1. In addition, since the STA1 transmits BA1-2 at the time of day t96, reception success/failure information of the pieces of data #16 to data #18 can be included in BA1-2.

As described above, in FIG. 7, reception success/failure information of the pieces of data #16 to data #18 not included in BA1-1 can be transmitted by being included in BA1-2.

Information with respect to the number of transmissions of BAs and a time interval of each BA may be described in an A-MPDU or exchanged in advance at the time of establishment of a BA session. In addition, as described with reference to FIG. 7, a probability of success of reception may be improved by lowering SINR by a required amount by reducing a transmission rate of BA instead of transmitting the BA a plurality of times.

Furthermore, while the reception success/failure information for each sub-frame is described in the BA by a Bitmap, the reception success/failure information may be described in smaller units such as for each OFDM symbol instead of in sub-frame units. Accordingly, for example, at the time of day t92 shown in FIG. 7, while the STA2 does not share the reception success/failure information of the entire piece of data #9, the reception success/failure information of a symbol being a part of the data #9 can be transmitted by being described in BA2-1.

As described above, in the fifth sequence, since BA is transmitted a plurality of times after receiving a final piece of data of another link, data of both links can be reliably transmitted.

<Selection Method of Each Sequence>

Each sequence described above may be performed when the Non-AP MLD transmits a BA including reception success/failure information with respect to data of A-MPDU1 and A-MPDU2 using only link 1 or link 2.

The AP MLD selects the sequences described above from information collected from the Non-AP MLD or peripheral terminals and information on itself and secures redundancy of a Block Ack.

The AP MLD may determine which sequence is to be used based on a state of a buffer inside the AP MLD itself.

When a transmission buffer inside the AP2 has leeway after the AP1 transmits A-MPDU1, the AP MLD saves a sub-frame in A-MPDU1 so that the AP2 can transmit a part of the sub-frame in A-MPDU1 as in the first sequence described above with reference to FIG. 3. Subsequently, the AP MLD generates A-MPDU2 including a part of a sub-frame in A-MPDU1 so that BA transmitted from the STA2 upon acquisition of a transmission right by the AP2 includes information with respect to all of the pieces of data in A-MPDU1 and transmits A-MPDU2 from the AP2.

In addition, the AP MLD may determine which sequence is to be used based on a state of traffic.

For example, as a state of traffic, when an average access delay time is equal to or less than a first threshold, the AP MLD performs control so that A-MPDU2 is transmitted after standing by for a certain amount of time after the AP2 acquires a transmission right as in the third sequence described above with reference to FIG. 5. In addition, when there are a plurality of traffic requiring low delay and high reliability, the AP MLD may aggregate and transmit sub-frames in A-MPDU1 and A-MPDU2 in a descending order of requirements of low delay and high reliability as in the second sequence described above with reference to FIG. 4.

The AP MLD may determine which sequence is to be used based on Capability information with respect to an ACK transmission operation of the Non-AP MLD.

For example, when the Non-AP MLD accommodates a delay to a time of day of start of transmission of a BA, the transmission delay time of BA2 is described in A-MPDU2 so that BA2 to be transmitted from the STA2 includes reception success/failure information with respect to all of the pieces of data in A-MPDU1 and then the AP MLD transmits A-MPDU2 from the AP2 as in the fourth sequence described above with reference to FIG. 6.

In addition, when the Non-AP MLD accommodates a plurality of transmissions of a BA, the AP MLD describes the number of transmissions or a transmission interval of BA2 in A-MPDU2 so that the STA2 can refer to the number of transmissions or the transmission interval and transmits A-MPDU2 from the AP2 as in the fifth sequence described above with reference to FIG. 7.

<Selection Processing of Sequence>

FIG. 8 is a flow chart for explaining selection processing of a sequence in which the AP MLD selects the sequences described above.

In step S11, the communication control portion 55 of the communication apparatus 11 shown in FIG. 2 controls each portion so as to receive information sharing delay information between links from the Non-AP MLD.

After acquiring a transmission right of the AP1, in step S12, the communication control portion 55 controls each portion so that the AP1 transmits A-MPDU1.

A sub-frame to be transmitted in A-MPDU-2 is saved in a transmission buffer in the AP2.

In step S13, the communication control portion 55 determines whether or not a frame can be further saved in the transmission buffer in the AP2. For example, the transmission buffer in the AP2 is provided in the communication storage portion 56.

In a case where it is determined in step S13 that a frame can be further saved in the transmission buffer in the AP2, the processing proceeds to step S14.

In step S14, the communication control portion 55 saves a sub-frame in a latter half of A-MPDU1 in the transmission buffer in the AP2.

In step S15, the communication control portion 55 controls each portion so that A-MPDU2 including the sub-frame in the latter half of A-MPDU1 is transmitted from the AP2 (the first sequence in FIG. 3).

On the other hand, in a case where it is determined in step S13 that a frame cannot be saved in the transmission buffer in the AP2, the processing proceeds to step S16.

In step S16, the communication control portion 55 determines whether or not an average access delay time as one of the states of traffic is equal to or below a first threshold. When it is determined in step S16 that the average access delay time is not equal to or below a first threshold, the processing proceeds to step S17.

In step S17, based on Capability information with respect to a transmission operation of ACK by the Non-AP MLD, the communication control portion 55 determines whether or not the Non-AP MLD accommodates continuous transmission of BA. When it is determined in step S17 that the Non-AP MLD accommodates continuous transmission of BAs, the processing proceeds to step S18.

In step S18, the communication control portion 55 controls each portion so that A-MPDU2 describing the number of transmissions and/or a transmission interval of BAs is transmitted from the AP2 (the fifth sequence in FIG. 7).

When it is determined in step S17 that the Non-AP MLD does not accommodate continuous transmission of BAs, the processing proceeds to step S19.

In step S19, the communication control portion 55 controls each portion so that A-MPDU2 of which a transmission rate has been reduced is transmitted from the AP2 (the third sequence in FIG. 5).

In addition, when it is determined in step S16 that the average access delay time is not equal to or below the first threshold, the processing proceeds to step S20.

In step S20, the communication control portion 55 controls each portion so that, after acquiring a transmission right for AP2, A-MPDU2 is transmitted from the AP2 after standing by for a prescribed amount of time (the third sequence in FIG. 5). The prescribed amount of time is an amount of time obtained by adding, to the information sharing delay time of the Non-AP MLD, a difference between a time at which the transmission right of AP1 has been acquired and a time at which the transmission right of AP2 has been acquired.

After steps S15 and S18 to S20, the selection processing of a sequence shown in FIG. 8 ends.

2. Second Embodiment (Decoding in Sub-Frame Units Disabled)

As a second embodiment, an example of a case where an A-MPDU terminal is unable to perform decoding for each A-MPDU sub-frame will be described.

Sequence Example of Wireless Communication According to Second Embodiment

Figure 9:
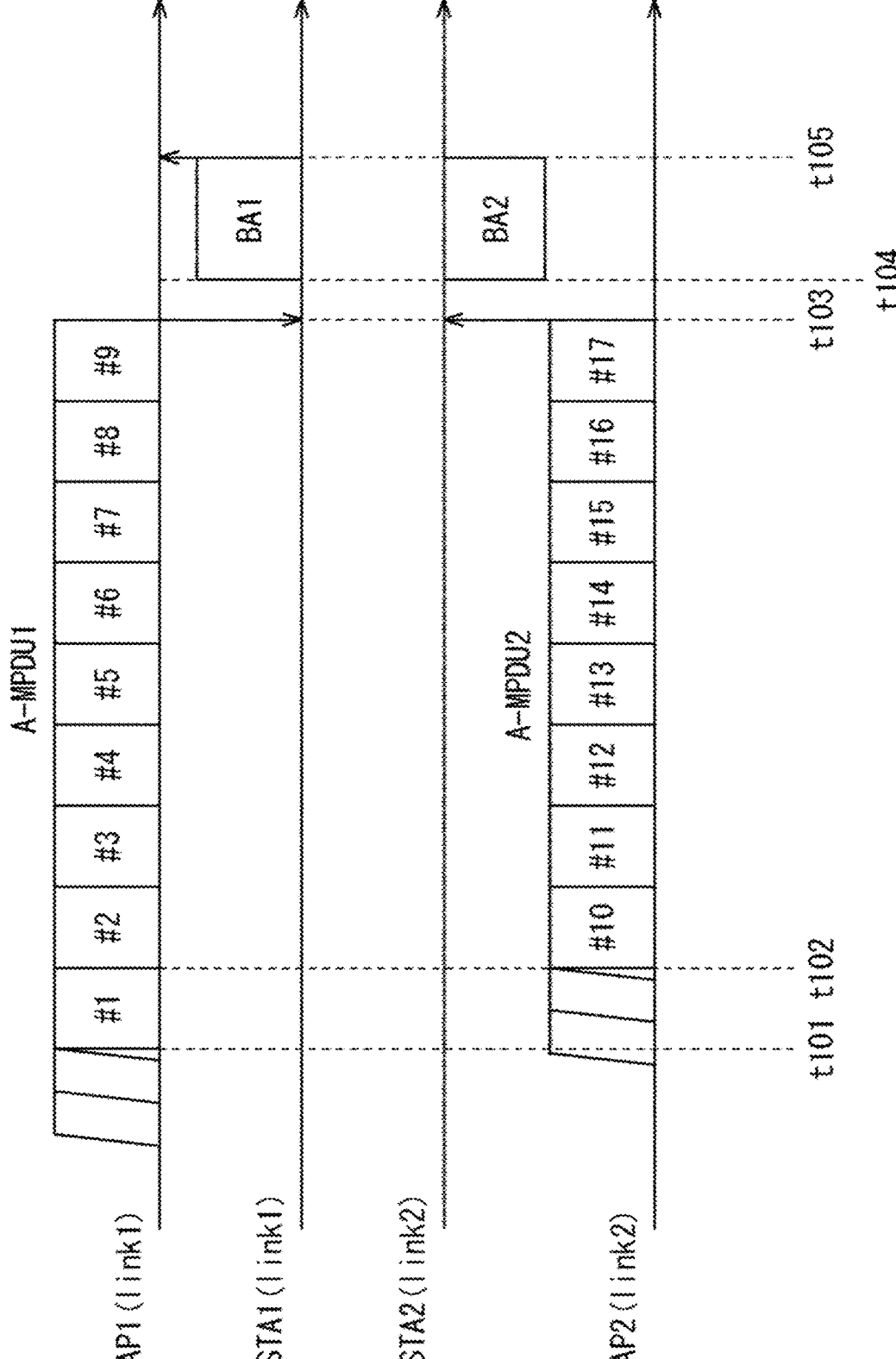
FIG. 9 is a diagram showing a sequence of wireless communication according to a second embodiment.

FIG. 9 is a diagram showing a sequence for explaining a series of operations of wireless communication according to the second embodiment.

Since portions of FIG. 9 that correspond to any of FIGS. 3 to 7 are basically the same, a detailed description thereof will be omitted.

Depending on how a Non-AP MLD implements data processing and signal processing, the Non-AP MLD may be unable to perform decoding for each A-MPDU sub-frame upon receiving A-MPDU and determine reception success/failure thereof as in the first embodiment.

In this case, as shown in FIG. 9, the Non-AP MLD cannot share reception success/failure information of each sub-frame in A-MPDU1 and A-MPDU2 until after all receptions of A-MPDU1 and A-MPDU2 have been completed.

Therefore, when the AP MLD determines that the Non-AP MLD does not accommodate decoding in A-MPDU sub-frame units when exchanging Capability information upon connection or the like, the AP MLD performs control so that A-MPDU1 and A-MPDU2 are transmitted by aligning times of day of end of transmission of A-MPDU1 and A-MPDU2. Accordingly, the Non-AP MLD can exchange reception success/failure information of each sub-frame and include, in BA1 and BA2, reception success/failure information with respect to all of the pieces of data in A-MPDU1 and A-MPDU2.

To describe the case of FIG. 9 in specific terms, at a time of day t101, the AP1 acquires a transmission right and starts data transmission (A-MPDU1) to the STA1, and completes transmission at a time of day t103. A-MPDU1 is constituted of pieces of data #1 to data #9.

At the time of day t103, when the STA1 completes reception of the data #9 being a last piece of data of A-MPDU1, as information sharing in an MLD, the STA1 shares reception success/failure information of the pieces of data #1 to data #9 with the STA2.

On the other hand, after the AP1 starts data transmission, at a time of day t102, the AP2 acquires a transmission right and starts data transmission (A-MPDU2) to the STA2.

In doing so, the AP2 performs control so that A-MPDU2 is constituted of pieces of data #10 to data #17 in order to transmit A-MPDU1 and A-MPDU2 by aligning times of day of end of transmission thereof.

At the time of day t103, when the STA2 completes reception of the data #17 being a last piece of data of A-MPDU2, as information sharing in an MLD, the STA2 shares reception success/failure information of the pieces of data #10 to data #17 with the STA1.

Accordingly, at a time of day t104, the STA1 can start transmission to the AP1 of BA1 including reception success/failure information of the pieces of data #10 to data #17 in addition to the reception success/failure information of the pieces of data #1 to data #9. In addition, at the time of day t104, the STA2 can also start transmission to the AP2 of BA2 including reception success/failure information of the pieces of data #1 to data #9 in addition to the reception success/failure information of the pieces of data #10 to data #17.

At a time of day t105, the STA1 ends transmission of BA1 and the STA2 ends transmission of BA2.

As described above, in the second embodiment, since an A-MPDU frame is configured so that transmission timings of BA are consistent among a plurality of links, a BA is to be simultaneously transmitted using a plurality of links and the BA can be reliably confirmed.

3. Others

Advantageous Effects of Present Technique

As described above, according to the present technique, communication is performed using a first link and communication is performed using a second link. In addition, allocation control of allocating transmission data to first data and second data, transmission control of controlling transmission of the first data using the first link and transmission of the second data using the second link, and reception control of controlling reception using the first link of a first response including reception success/failure information indicating a success/failure of reception with respect to the first data and at least a part of the second data and reception using the second link of a second response including the reception success/failure information indicating a success/failure of reception with respect to the second data and at least a part of the first data are performed.

Accordingly, since redundancy of a BA can be improved, reliability of the BA can be increased and overall communication quality can be improved.

In addition, according to the present technique, the allocation control of transmission data, the transmission control of the first data and the second data, and reception control of the first response and the second response described above are performed in accordance with information (for example, a state of traffic) acquired from apparatuses in a periphery.

Accordingly, reliability of transmission of data can be improved. This is particularly effectively with respect to data which is required to be low delay or high reliability.

While an example of transmitting data from an AP MLD to a Non AP MLD has been described above, the processing described above can be similarly realized when transmitting data from a Non AP MLD to an AP MLD.

Configuration Example of Computer

The series of processing described above can be executed by hardware or software. When the series of processes is executed by software, a program constituting the software is installed from a program recording medium on a computer embedded in dedicated hardware, a general-purpose personal computer, or the like.

Figure 10:
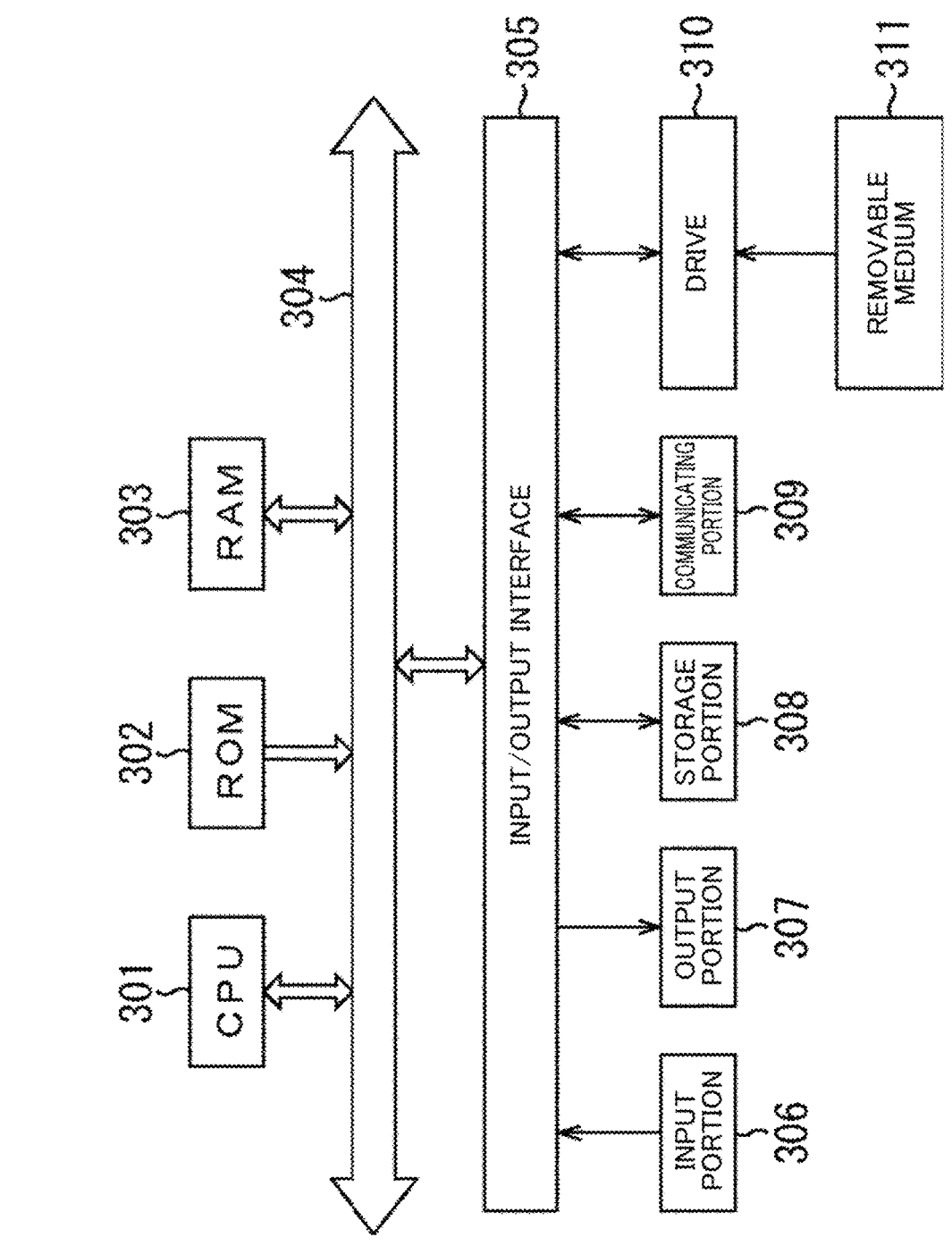
FIG. 10 is a block diagram showing a configuration example of a computer.

FIG. 10 is a block diagram illustrating a configuration example of hardware of a computer that executes the series of processing described above using a program.

A CPU 301, a ROM 302, and a RAM 303 are connected to each other by a bus 304.

An input/output interface 305 is further connected to the bus 304. An input portion 306 including a keyboard or a mouse and an output portion 307 including a display or a speaker are connected to the input/output interface 305. In addition, a storage portion 308 including a hard disk or a nonvolatile memory, a communicating portion 309 including a network interface, and a drive 310 driving a removable medium 311 are connected to the input/output interface 305.

In the computer configured as described above, for example, the CPU 301 loads a program stored in the storage portion 308 onto the RAM 303 via the input/output interface 305 and the bus 304 and executes the program to perform the series of processing steps described above.

For example, the program executed by the CPU 301 is recorded on the removable medium 311 or provided via a wired or wireless transfer medium such as a local area network, the Internet, or a digital broadcast to be installed in the storage portion 308.

Note that the program executed by the computer may be a program that performs processing chronologically in the order described in the present specification or may be a program that performs processing in parallel or at a necessary timing such as a called time.

Note that, in the present specification, a system is a set of a plurality of constituent elements (apparatuses, modules (components), or the like), and all of the constituent elements may or may not be located in the same housing. Accordingly, a plurality of apparatuses housed in separate housings and connected via a network, and one apparatus in which a plurality of modules are housed in one housing are both systems.

In addition, the advantageous effects described in the present specification are merely exemplary and not limited, and other advantageous effects may be produced.

The embodiments of the present technique are not limited to the aforementioned embodiments, and various modifications can be made without departing from the gist of the present technique.

For example, the present technique can be configured as cloud computing in which one function is shared and processed in common by a plurality of apparatuses via a network.

In addition, each step explained with reference to the flowcharts described above can be executed by one apparatus or executed in a shared manner by a plurality of apparatuses.

Furthermore, in a case where one step includes a plurality of processing steps, the plurality of processing steps included in the one step can be executed by one apparatus or executed in a shared manner by a plurality of apparatuses.

Combination Example of Configuration

The present technique can also be configured as follows.
(1) A wireless communication apparatus, including:
   a first communicating portion configured to perform communication using a first link;
   a second communicating portion configured to perform communication using a second link; and
   a communication control portion configured to perform allocation control of allocating transmission data to first data and second data, transmission control of controlling transmission of the first data using the first link and transmission of the second data using the second link, and reception control of controlling reception using the first link of a first response including reception success/failure information indicating a success/failure of reception with respect to the first data and at least a part of the second data and reception using the second link of a second response including the reception success/failure information indicating a success/failure of reception with respect to the second data and at least a part of the first data.

(2) The wireless communication apparatus according to (1), wherein the communication control portion is configured to perform allocation control of also allocating, to the second data, a part of data having been allocated to the first data among the transmission data.

(3) The wireless communication apparatus according to (2), wherein the communication control portion is configured to perform allocation control of allocating so that a portion at a tail of the first data and a portion at a head of the second data overlap with each other.

(4) The wireless communication apparatus according to (1), wherein the communication control portion is configured to perform allocation control of allocating the transmission data in order from the head of the first data and the second data based on a priority of the transmission data.

(5) The wireless communication apparatus according to (1), wherein the communication control portion is configured to perform transmission control of controlling a frame length of the second data so that the reception success/failure information with respect to at least one piece of the first data is included in the second response.

(6) The wireless communication apparatus according to (1), wherein the communication control portion is configured to perform transmission control of standing by for start of transmission of the second data so that the reception success/failure information with respect to at least one piece of the first data is included in the second response.

(7) The wireless communication apparatus according to (1), wherein the communication control portion is configured to describe, in a frame including the first data, transmission control information for performing control such that the reception success/failure information with respect to at least one piece of the first data is included in the second response, and the second communicating portion is configured to transmit the frame.

(8) The wireless communication apparatus according to (7), wherein the transmission control information includes a transmission delay time of the second response.

(9) The wireless communication apparatus according to (7), wherein the transmission control information includes the number of transmissions and a transmission interval of the second response.

(10) The wireless communication apparatus according to any one of (1) to (9), wherein at least one of the first communicating portion and the second communicating portion is configured to acquire, from another wireless communication apparatus, information with respect to a time it takes to exchange the reception success/failure information between the first link and the second link, and the communication control portion is configured to perform, in accordance with the information with respect to the time it takes to exchange the reception success/failure information, allocation control of the transmission data, transmission control of the first data and the second data, and reception control of the first response and the second response.

(11) The wireless communication apparatus according to any one of (1) to (10), wherein the communication control portion is configured to perform, in accordance with information acquired from an apparatus in a periphery, allocation control of the transmission data, transmission control of the first data and the second data, and reception control of the first response and the second response.

(12) A wireless communication method including causing a wireless communication apparatus to:

perform communication using a first link;

perform communication using a second link; and perform allocation control of allocating transmission data to first data and second data, transmission control of controlling transmission of the first data using the first link and transmission of the second data using the second link, and reception control of controlling reception using the first link of a first response including reception success/failure information indicating a success/failure of reception with respect to the first data and at least a part of the second data and reception using the second link of a second response including the reception success/failure information indicating a success/failure of reception with respect to the second data and at least a part of the first data.

(13) A wireless communication apparatus, including:

a first communicating portion configured to perform communication using a first link;

a second communicating portion configured to perform communication using a second link; and a communication control portion configured to perform reception control of controlling reception of first data using the first link and reception of second data using the second link and transmission control of controlling transmission using the first link of a first response including reception success/failure information indicating a success/failure of reception with respect to the first data and at least a part of the second data and transmission using the second link of a second response including the reception success/failure information indicating a success/failure of reception with respect to the second data and at least a part of the first data.

(14) The wireless communication apparatus according to (13), wherein the communication control portion is configured to perform transmission control of the first response and the second response based on transmission control information with respect to transmission of the second response included in a second frame including the second data from the other wireless communication apparatus.

(15) The wireless communication apparatus according to (14), wherein the transmission control information includes a transmission delay time of the second response, and the communication control portion is configured to delay transmission of the second response based on the transmission control information.

(16) The wireless communication apparatus according to (14), wherein the transmission control information includes the number of transmissions and a transmission interval of the second response, and the communication control portion is configured to control the number of transmissions and the transmission interval of the second response based on the transmission control information.

(17) The wireless communication apparatus according to (14), wherein at least one of the first communicating portion and the second communicating portion is configured to transmit, to the other wireless communication apparatus, information with respect to a time it takes to exchange the reception success/failure information between the first link and the second link.

(18) A wireless communication method including causing a wireless communication apparatus to:

perform communication using a first link;

perform communication using a second link; and perform reception control of controlling reception of first data using the first link and reception of second data using the second link and transmission control of controlling transmission using the first link of a first response including reception success/failure information indicating a success/failure of reception with respect to the first data and at least a part of the second data and transmission using the second link of a second response including the reception success/failure information indicating a success/failure of reception with respect to the second data and at least a part of the first data.

REFERENCE SIGNS LIST

11 Wireless communication apparatus
31 Communicating portion
32 Control portion
33 Storage portion
41, 41-1, 41-2 Antenna
51, 51-1, 51-2 Amplifying portion
52, 52-1, 52-2 Wireless interface portion
53, 53-1, 53-2 Signal processing portion
53 Data processing portion
55 Communication control portion
56 Communication storage portion
61, 61-1, 61-2 Individual data processing portion
62 Common data processing portion

The invention claimed is:

1. A wireless communication apparatus, comprising:

a first communicating circuit configured to perform communication using a first link;

a second communicating circuit configured to perform communication using a second link; and a communication control circuit configured to perform:

allocation control of allocating transmission data to first data and second data based on transmission identifiers (TIDs) of the transmission data, transmission control of:

controlling transmission of the first data using the first link, and controlling transmission of the second data using the second link, and reception control of:

controlling reception using the first link of a first response including reception success/failure information indicating a success/failure of reception with respect to the first data and at least a part of the second data, and controlling reception using the second link of a second response including the reception success/failure information indicating a success/failure of reception with respect to the second data and at least a part of the first data, wherein:

at least one of the first communicating circuit and the second communicating circuit is configured to acquire, from another wireless communication apparatus, information with respect to a time it takes to exchange the reception success/failure information between the first link and the second link, and the communication control circuit is configured to perform, in accordance with the information with respect to the time it takes to exchange the reception success/failure information, allocation control of the transmission data, transmission control of the first data and the second data, and reception control of the first response and the second response.

2. The wireless communication apparatus according to claim 1, wherein the allocating of the transmission data to the first data and the second data based on the TIDs of the transmission data includes allocating, to the second data, a part of the transmission data that has been allocated to the first data among the transmission data.

3. The wireless communication apparatus according to claim 2, wherein the allocating of the transmission data to the first data and the second data based on the TIDs of the transmission data includes allocating the transmission data so that a portion at a tail of the first data and a portion at a head of the second data overlap with each other.

4. The wireless communication apparatus according to claim 1, wherein the allocating of the transmission data to the first data and the second data based on the TIDs of the transmission data includes allocating the transmission data in order from both a head of the first data and a head of the second data based on a priority of the transmission data.

5. The wireless communication apparatus according to claim 1, wherein the transmission control includes controlling a frame length of the second data so that the reception success/failure information with respect to at least one piece of the first data is included in the second response.

6. The wireless communication apparatus according to claim 1, wherein the transmission control includes standing by for a start of a transmission of the second data so that the reception success/failure information with respect to at least one piece of the first data is included in the second response.

7. The wireless communication apparatus according to claim 1, wherein the communication control circuit is configured to include, in a frame including the first data, transmission control information for performing control such that the reception success/failure information with respect to at least one piece of the first data is included in the second response, and the second communicating circuit is configured to transmit the frame, wherein the transmission control information includes:

a transmission delay time of the second response, or
a number of transmissions and a transmission interval
of the second response.

8. The wireless communication apparatus according to
claim 1, wherein
the communication control circuit is configured to per-
form, in accordance with information acquired from an
apparatus in a periphery, the allocation control of the
transmission data, the transmission control of the first
data and the second data, and the reception control of
the first response and the second response.

9. A wireless communication method performed by a
wireless communication apparatus and comprising:
performing, by a first communicating circuit of the wire-
less communication apparatus, communication using a
first link;
performing, by a second communicating circuit of the
wireless communication apparatus, communication
using a second link; and
performing:
allocation control of allocating transmission data to first
data and second data based on transmission identi-
fiers (TIDs) of the transmission data,
transmission control of:
controlling transmission of the first data using the
first link, and
controlling transmission of the second data using the
second link, and reception control of:
controlling reception using the first link of a first
response including reception success/failure infor-
mation indicating a success/failure of reception
with respect to the first data and at least a part of the
second data, and
controlling reception using the second link of a second
response including the reception success/failure infor-
mation indicating a success/failure of reception with
respect to the second data and at least a part of the first
data,
wherein the wireless control method further comprises:
acquiring, by at least one of the first communicating
circuit and the second communicating circuit from
another wireless communication apparatus, informa-
tion with respect to a time it takes to exchange the
reception success/failure information between the
first link and the second link, and
performing in accordance with the information with
respect to the time it takes to exchange the reception
success/failure information, allocation control of the
transmission data, transmission control of the first data
and the second data, and reception control of the first
response and the second response.

10. A wireless communication apparatus, comprising:
a first communicating circuit configured to perform com-
munication using a first link;
a second communicating circuit configured to perform
communication using a second link; and
a communication control circuit configured to perform:
reception control of:
controlling reception of first data from another wire-
less communication apparatus using the first link,
and
controlling reception of second data from the other
wireless communication apparatus using the sec-
ond link, and transmission control of:
controlling transmission using the first link of a first
response including reception success/failure information indicating a success/failure of reception
with respect to the first data and at least a part of
the second data, and
controlling transmission using the second link of a
second response including the reception success/
failure information indicating a success/failure of
reception with respect to the second data and at
least a part of the first data,
wherein the transmission data is allocated to the first
data and the second data by the other wireless
communication apparatus based on transmission
identifiers (TIDs) of the transmission data,
wherein:
the communication control circuit is configured to
perform transmission control of the first response
and the second response based on transmission con-
trol information with respect to transmission of the
second response included in a second frame includ-
ing the second data from another wireless commu-
nication apparatus, and
at least one of the first communicating circuit and the
second communicating circuit is configured to trans-
mit, to the other wireless communication apparatus,
information with respect to a time it takes to
exchange the reception success/failure information
between the first link and the second link.

11. The wireless communication apparatus according to
claim 10, wherein
the transmission control information includes a transmis-
sion delay time of the second response, and
the communication control circuit is configured to delay
transmission of the second response based on the
transmission control information.

12. The wireless communication apparatus according to
claim 10, wherein
the transmission control information includes a number of
transmissions and a transmission interval of the second
response, and
the communication control circuit is configured to control
the number of transmissions and the transmission inter-
val of the second response based on the transmission
control information.

13. A wireless communication method comprising per-
formed by a wireless communication apparatus and com-
prising:
performing, by a first communicating circuit of the wire-
less communication apparatus, communication using a
first link;
performing, by a second communicating circuit of the
wireless communication apparatus, communication
using a second link;
performing reception control of:
controlling reception of first data from another wireless
communication apparatus using the first link; and
controlling reception of second data from the other
wireless communication apparatus using the second
link; and
performing transmission control of:
controlling transmission using the first link of a first
response including reception success/failure infor-
mation indicating a success/failure of reception with
respect to the first data and at least a part of the
second data; and
controlling transmission using the second link of a
second response including the reception success/ failure information indicating a success/failure of reception with respect to the second data and at least a part of the first data, wherein the transmission data is allocated to the first data and the second data by the other wireless communication apparatus based on transmission identifiers (TIDs) of the transmission data, wherein the method further comprises:

performing transmission control of the first response and the second response based on transmission control information with respect to transmission of the second response included in a second frame including the second data from another wireless communication apparatus, and transmitting, by at least one of the first communicating circuit and the second communicating circuit to the other wireless communication apparatus, information with respect to a time it takes to exchange the reception success/failure information between the first link and the second link.

* * * * *